(12) United States Patent
Xu

(10) Patent No.: US 9,764,242 B2
(45) Date of Patent: Sep. 19, 2017

(54) METHOD AND SYSTEM FOR PROVIDING GAME RANKING INFORMATION

(71) Applicant: Tencent Technology (Shenzhen) Company Limited, Shenzhen (CN)

(72) Inventor: Gaoqian Xu, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 327 days.

(21) Appl. No.: 14/569,391

(22) Filed: Dec. 12, 2014

(65) Prior Publication Data
US 2015/0105153 A1    Apr. 16, 2015

Related U.S. Application Data

(63) Continuation of application No. PCT/CN2014/079475, filed on Jun. 9, 2014.

(30) Foreign Application Priority Data

Oct. 16, 2013  (CN) .......................... 2013 1 0486078

(51) Int. Cl.
| | | |
|---|---|---|
| A63F 9/00 | (2006.01) | |
| A63F 13/798 | (2014.01) | |
| A63F 13/537 | (2014.01) | |
| A63F 13/795 | (2014.01) | |

(52) U.S. Cl.
CPC .......... *A63F 13/798* (2014.09); *A63F 13/537* (2014.09); *A63F 13/795* (2014.09)

(58) Field of Classification Search
None
See application file for complete search history.

(56) References Cited

U.S. PATENT DOCUMENTS 6,273,821 B1 *  8/2001  Moriguchi ............. A63F 13/12
                                                    463/40
2002/0198046 A1   12/2002  Nakazawa
(Continued)

FOREIGN PATENT DOCUMENTS

| CN | 101393419 A | 3/2009 |
| CN | 101641141 A | 2/2010 |

(Continued)

OTHER PUBLICATIONS

English Translation of CN 102646161 A. Aug. 22, 2012.*
(Continued)

*Primary Examiner* — Seng H Lim
(74) *Attorney, Agent, or Firm* — Morgan, Lewis & Bockius LLP

(57) ABSTRACT

A client device with processor(s), memory, and a display captures an image of a displayed interface of a game being executed on the client device. The image includes game data corresponding to game performance of a user of the client device. The client device provides, to a server, the image for extraction of the game data from the image of the displayed interface of the game. In response to providing the image, the client device receives, from the server, game ranking information specifying a ranking for the user that is based on the game data extracted from the image. In some embodiments, the client device displays the game ranking information in an interface of a social networking platform, where the game ranking information includes relative rankings of the user and social network contact(s) of the user on the social networking platform.

20 Claims, 16 Drawing Sheets

(56) References Cited

U.S. PATENT DOCUMENTS

| | | | |
|---|---|---|---|
| 2006/0063577 A1* | 3/2006 | Downs, III | A63F 1/18 463/11 |
| 2008/0200244 A1* | 8/2008 | Rowe | G07F 17/32 463/27 |
| 2010/0138775 A1 | 6/2010 | Kohen et al. | |
| 2012/0157129 A1* | 6/2012 | Kuwahara | A63F 13/12 455/457 |
| 2014/0243088 A1* | 8/2014 | Oikawa | A63F 13/12 463/31 |
| 2015/0209680 A1* | 7/2015 | Lim | A63F 13/87 463/31 |

FOREIGN PATENT DOCUMENTS

| | | |
|---|---|---|
| CN | 101667228 A | 3/2010 |
| CN | 102306279 A | 1/2012 |
| CN | 102426647 A | 4/2012 |
| CN | 102646161 A | 8/2012 |
| CN | 102932456 A | 2/2013 |
| CN | 102982235 A | 3/2013 |
| CN | 103106387 A | 5/2013 |
| CN | 103530520 A | 1/2014 |
| KR | 20030043348 A | 6/2003 |
| WO | WO 0183059 A1 | 11/2001 |

OTHER PUBLICATIONS

Tencent Technology, ISR, PCT/CN2014/079475, Sep. 3, 2014, 3 pgs.

Tencent Technology, Written Opinion, PCT/CN2014/079475, Sep. 3, 2014, 5 pgs.

Tencent Technology, IPRP, PCT/CN2014/079475, Apr. 19, 2016, 6 pgs.

* cited by examiner

METHOD AND SYSTEM FOR PROVIDING GAME RANKING INFORMATION

PRIORITY CLAIM AND RELATED APPLICATIONS

This application is a continuation application of PCT Patent Application No. PCT/CN2014/079475, entitled "METHOD AND SYSTEM FOR PROVIDING GAME RANKING INFORMATION" filed on Jun. 9, 2014, which claims priority to Chinese Patent Application Serial No. 201310486078.4, entitled "Method and Terminal for Obtaining Data," filed Oct. 16, 2013, the entirety of both of which is incorporated herein by reference.

FIELD OF THE TECHNOLOGY

The present application relates to the field of Internet technologies, and, more particularly, to a method and system for providing game ranking information.

BACKGROUND OF THE TECHNOLOGY

After a game is played, game scores are typically reported to a background server through a gaming platform, and the background server determines rankings for players of the game based on the reported game scores.

When a game reports scores to the gaming platform, a protocol interface or an Application Programming Interface ("API") provided by the platform must be used. If platform A intends to display scores of game B, game B must be accessible to platform A. To that end, game B's developer must install in the game an interface or API to platform A, so that game B can use services provided by platform A. As such, game B uses the interface or API to provide platform A with the user' scores in the course of the game when the game ends.

If platform A needs intends to display scores for a number of games, platform A must cooperate with a number of game developers. Furthermore, platform A must enable the number of game developers to install in their game an interface or API to platform A. For the platform provider, the cost of the negotiation process is very high, and it is difficult to access a large number of games. For the game developers, it is necessary to install different interfaces or APIs for different platform providers, and the cost of version management is also very high.

Thus, in the prior art, only when a game reports scores to a platform (e.g., through the required API), can a terminal (or client device) of that platform acquire the scores of the game. As such, it is a complicated process for the terminal (or client device) to acquire users' game scores.

SUMMARY

Based on the description in the background section, it is discovered that the existing technology has at least the following problem(s): It is inefficient and costly to interface games with a platform provider and, in some circumstances, multiple platform providers.

In some embodiments, a method of providing game ranking information is performed at a client device (e.g., client device 104, FIGS. 1-2) with one or more processors, memory, and a display. The method includes capturing a respective image of at least a portion of a displayed interface of a game, while a game is executing on the client device. The respective image includes game data corresponding to game performance of a user of the client device. In some embodiments, the method includes invoking a screen capture function of a respective operating system of the client device while the game data is being displayed on the client device. The method includes providing, to a server system (e.g., server system 108, FIGS. 1 and 3), the respective image for extraction of the game data from the respective image of at least the portion of the displayed interface of the game. The method includes, responsive to providing the respective image to the server system, receiving, from the server system, game ranking information specifying a ranking for the user that is based at least in part on the game data extracted from the respective image of at least the portion of the displayed interface of the game. In some embodiments, the method includes displaying the game ranking information in an interface of a social networking platform, where the game ranking information includes relative rankings of the user and one or more social network contacts of the user on the social networking platform.

In some embodiments, a method of providing game ranking information is performed at a server system (e.g., server system 108, FIGS. 1 and 3) with one or more processors and memory and memory. The method includes obtaining, from a client device (e.g., a respective client device 104, FIGS. 1-2), a respective image of at least a portion of a displayed interface of a game executing on the client device, the respective image includes game data corresponding to game performance of a user of the client device. The method includes: extracting the game data from the respective image received from the client device; and determining game ranking information for the user of the client device based at least in part on the game data extracted from the respective image received from the client device, where the game ranking information indicates relative ranking of the user of the client device and one or more social network contacts of the user on a social network platform. The method includes sending, to the client device, the game ranking information.

In some embodiments, an electronic device or a computer system (e.g., client device 104, FIGS. 1-2 or server system 108, FIGS. 1 and 3) includes one or more processors and memory storing one or more programs for execution by the one or more processors, the one or more programs include instructions for performing, or controlling performance of, the operations of any of the methods described herein. In some embodiments, a non-transitory computer readable storage medium storing one or more programs, the one or more programs comprising instructions, which, when executed by an electronic device or a computer system (e.g., client device 104, FIGS. 1-2 or server system 108, FIGS. 1 and 3) with one or more processors, cause the electronic device or computer system to perform, or control performance of, the operations of any of the methods described herein. In some embodiments, an electronic device or a computer system (e.g., client device 104, FIGS. 1-2 or server system 108, FIGS. 1 and 3) includes: means for performing, or controlling performance of, the operations of any of the methods described herein.

The embodiments described herein may provide at least the following advantages. For example, game performance data can be collected from gaming devices of various format and configurations without any game-specific or hardware-specific APIs, thus the gaming performance data collected from various game hardware can be aggregated and ranked to provide a universal ranking. Furthermore, on a social network platform, the ranking can be specific to gamers that are social network contacts of one another, but may be using different gaming hardware. Various advantages of the present application are apparent in light of the descriptions below.

BRIEF DESCRIPTION OF THE DRAWINGS

The aforementioned features and advantages of the techniques as well as additional features and advantages thereof will be more clearly understood hereinafter as a result of a detailed description of preferred embodiments when taken in conjunction with the drawings.

To illustrate the technical solutions according to the embodiments of the present application more clearly, the accompanying drawings for describing the embodiments are introduced briefly in the following. Apparently, the accompanying drawings in the following description are only some embodiments of the present application; persons skilled in the art may obtain other drawings according to the accompanying drawings without paying any creative effort.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

The technical solutions in the embodiments of the present application will be clearly and fully described below with reference to the accompanying drawings in the embodiments of the present application. It is obvious that the embodiments to be described are only a part rather than all of the embodiments of the present application. All other embodiments derived by persons skilled in the art based on the embodiments of the present application without carrying out creative activities shall fall within the scope of the present application.

Figure 1:
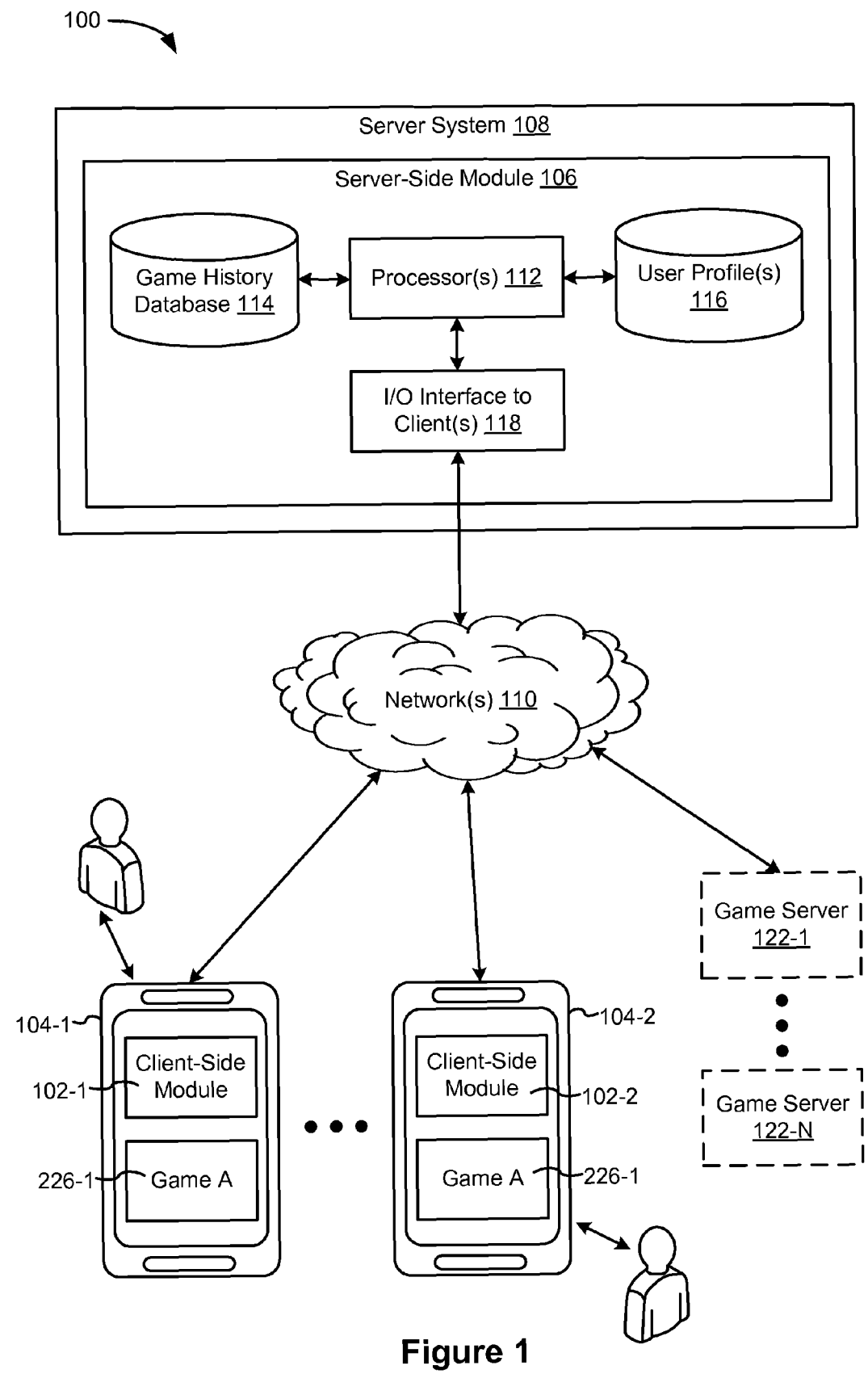
FIG. 1 is a block diagram of a server-client environment in accordance with some embodiments.

As shown in FIG. 1, data processing for a social networking platform is implemented in a server-client environment 100 in accordance with some embodiments. In accordance with some embodiments, server-client environment 100 includes client-side processing 102-1, 102-2 (hereinafter "client-side module 102") executed on a client device 104-1, 104-2, and server-side processing 106 (hereinafter "server-side module 106") executed on a server system 108. Client-side module 102 communicates with server-side module 106 through one or more networks 110. Client-side module 102 provides client-side functionalities for the social networking platform, such as providing instant messaging services, and/or providing game ranking information by capturing image(s) of a displayed interface of a game that includes game data (e.g., a score, a level completion or lap time, an achievement, and the like for the game), and communications with server-side module 106. The client-side module 102 is configured to execute concurrently with and independent of the control of the game software, in order to capture the images of a displayed interface of the game. The client-side module 102 is also able to invoke screen capture functions of the operating system, and/or other graphical processing functionalities related to the screen capturing. Server-side module 106 provides server-side functionalities for the social networking platform such as providing instant messaging services, and providing game ranking information by determining game ranking information (e.g., based at least in part on game data extracted from image(s) of displayed interfaces of the game) for any number of client modules 102 each residing on a respective client device 104.

In some embodiments, server-side module 106 includes one or more processors 112, game history database 114, one or more user profiles 116, and an I/O interface to one or more clients 118. I/O interface to one or more clients 118 facilitates the client-facing input and output processing for server-side module 106. One or more processors 112 receive images of the displayed interface of the game from client devices 104 and determine game ranking information based on game data extracted from the received images of the displayed interface of the game. Game history database 114 stores previously extracted game data, and one or more user profiles 116 store one or more user profiles each associated with a respective user of a client device, including custom parameters (e.g., age, location, hobbies, etc.) for the respective user in the social networking platform, previously determined game ranking information for the respective user, social network contacts associated with the respective user in the social networking platform, and identified trends and/or likes/dislikes of the respective user.

Examples of client device 104 include, but are not limited to, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, or a combination of any two or more of these data processing devices or other data processing devices. In some embodiments, client device 104 communicates with one or more game servers 122 (e.g., providing functionality for online multiplayer games) through one or more networks 110.

Examples of one or more networks 110 include local area networks (LAN) and wide area networks (WAN) such as the Internet. One or more networks 110 are, optionally, implemented using any known network protocol, including various wired or wireless protocols, such as Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

Server system 108 is implemented on one or more stand-alone data processing apparatuses or a distributed network of computers. In some embodiments, server system 108 also employs various virtual devices and/or services of third party service providers (e.g., third-party cloud service providers) to provide the underlying computing resources and/or infrastructure resources of server system 108.

Server-client environment 100 shown in FIG. 1 includes both a client-side portion (e.g., client-side module 102) and a server-side portion (e.g., server-side module 106). In some embodiments, data processing is implemented as a stand-alone application installed on client device 104. In addition, the division of functionalities between the client and server portions of client environment data processing can vary in different embodiments. For example, in some embodiments, client-side module 102 is a thin-client that provides only user-facing input and output processing functions, and delegates all other data processing functionalities to a backend server (e.g., server system 108).

Figure 2:
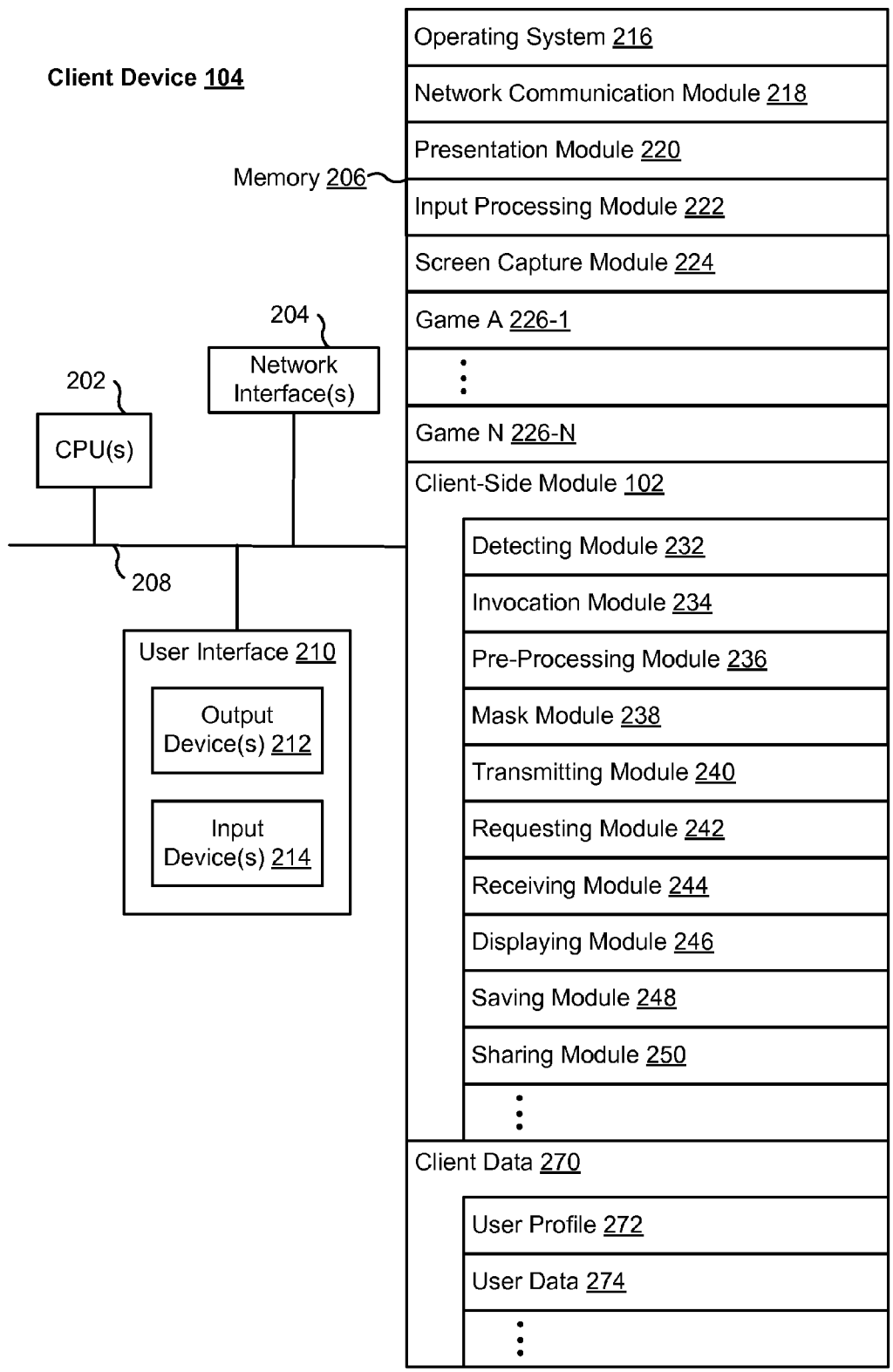
FIG. 2 is a block diagram of a client device in accordance with some embodiments.

FIG. 2 is a block diagram illustrating a representative client device 104 associated with a user in accordance with some embodiments. Client device 104, typically, includes one or more processing units (CPUs) 202, one or more network interfaces 204, memory 206, and one or more communication buses 208 for interconnecting these components (sometimes called a chipset). Client device 104 also includes a user interface 210. User interface 210 includes one or more output devices 212 that enable presentation of media content, including one or more speakers and/or one or more visual displays. User interface 210 also includes one or more input devices 214, including user interface components that facilitate user input such as a keyboard, a mouse, a voice-command input unit or microphone, a touch screen display, a touch-sensitive input pad, a gesture capturing camera, or other input buttons or controls. Furthermore, some client devices 104 use a microphone and voice recognition or a camera and gesture recognition to supplement or replace the keyboard. Memory 206 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 206, optionally, includes one or more storage devices remotely located from one or more processing units 202. Memory 206, or alternatively the non-volatile memory within memory 206, includes a non-transitory computer readable storage medium. In some implementations, memory 206, or the non-transitory computer readable storage medium of memory 206, stores the following programs, modules, and data structures, or a subset or superset thereof:

- operating system 216 including procedures for handling various basic system services and for performing hardware dependent tasks;
- network communication module 218 for connecting client device 104 to other computing devices (e.g., server system 108 and one or more game servers 122) connected to one or more networks 110 via one or more network interfaces 204 (wired or wireless);
- presentation module 220 for enabling presentation of information (e.g., a user interface for a widget, webpage, game, or an application, audio and/or video content, text, etc.) at client device 104 via one or more output devices 212 (e.g., displays, speakers, etc.) associated with user interface 210; and
- input processing module 222 for detecting one or more user inputs or interactions from one of the one or more input devices 214 and interpreting the detected input or interaction;
- screen capture module 224 for performing a screen shot of the current interface displayed on the display (e.g., capturing an image of at least a portion of a displayed interface of a game 226 being executed by client device 104); and
- one or more games or gaming application 226-1-226-N for execution by client device 104.

In some embodiments, memory 206 also includes client-side module 102, which provides client-side data processing and functionalities for a social networking platform (e.g., providing game ranking information). Client-side module 102 includes, but is not limited to:

- detecting module 232 for detecting a user input corresponding to the social networking platform;
- invocation module 234 for causing screen capture module 224 to capture an image of at least a portion of a displayed interface of a game 226 being executed by client device 104;
- pre-processing module 236 for discarding at least one portion of a full screen shot output by screen capture module 224 to obtain the image including the game data;
- mask module 238, responsive to a user input in an interface for the social networking platform that identifies the game being executed by client device 104, for providing a mask that is overlaid on the displayed interface of the game, where the mask conceals at least one portion of the displayed interface and exposes one or more portions of the displayed interface that include the game data;
- transmitting module 240 for providing to server system 108 the captured image of at least the portion of the displayed interface of the game 226 for extraction of the game data;
- requesting module 242, responsive to a user input in an interface for the social networking platform that requests game history information, for sending a request to server system 108 for game history information;
- receiving module 242 for receiving from server system 108 game ranking information based at least in part on game data extracted from the captured image of at least the portion of the displayed interface of the game, and, optionally, responsive to the request for game history information, for receiving from server system 108 game history information corresponding to the user of client device 104;
- displaying module 246 for displaying in an interface of the social networking platform game ranking information that includes the relative rankings of the user of client device 104 and one or more social network contacts of the user on the social networking platform and, optionally, game history information;
- saving module 248, responsive to a user input selecting an affordance in the interface for the social networking platform, for saving the captured image of at least the portion of the displayed interface of the game 226 (e.g., to user data 274); and
- sharing module 250, responsive to a user input selecting a sharing affordance in the interface for the social networking platform, for sharing the game data or the captured image of at least the portion of the displayed interface of the game 226 via one or more social media resources.

In some embodiments, memory 206 also includes client data 270 storing data associated with the social networking platform. Client data 270 includes, but is not limited to:

user profile 272 storing a profile associated with the user of client device 104 including custom parameters (e.g., age, location, hobbies, etc.) for the user, previously determined game ranking information for the respective user, contacts associated with the user in the social networking platform, and identified trends and/or likes/dislikes of the user; and user data 274 storing game data corresponding to games 226 and, optionally, captured images of at least the portion of the displayed interface of games 226.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 206, optionally, stores a subset of the modules and data structures identified above. Furthermore, memory 206, optionally, stores additional modules and data structures not described above.

Figure 3:
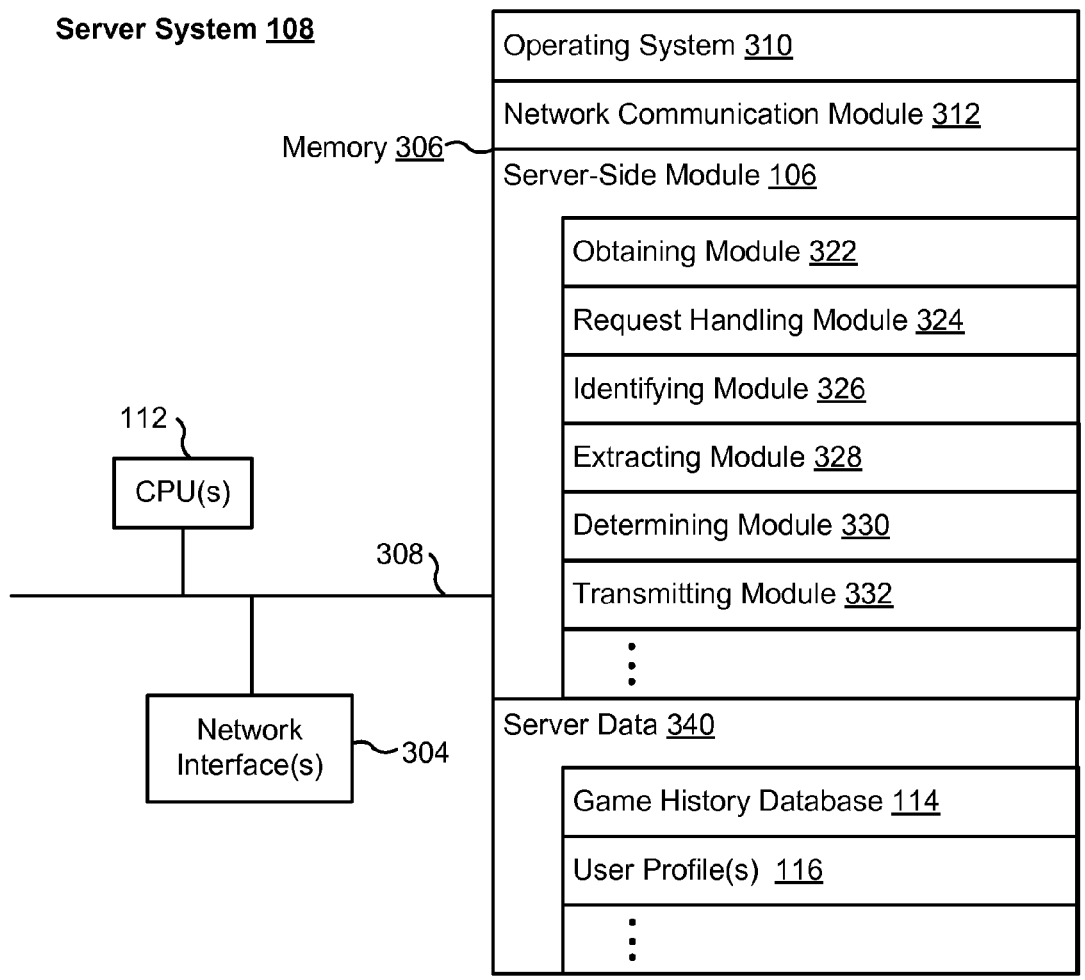
FIG. 3 is a block diagram of a server system in accordance with some embodiments.

FIG. 3 is a block diagram illustrating server system 108 in accordance with some embodiments. Server system 108, typically, includes one or more processing units (CPUs) 112, one or more network interfaces 304 (e.g., including I/O interface to one or more clients 118), memory 306, and one or more communication buses 308 for interconnecting these components (sometimes called a chipset). Memory 306 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 306, optionally, includes one or more storage devices remotely located from one or more processing units 112. Memory 306, or alternatively the non-volatile memory within memory 306, includes a non-transitory computer readable storage medium. In some implementations, memory 306, or the non-transitory computer readable storage medium of memory 306, stores the following programs, modules, and data structures, or a subset or superset thereof:

operating system 310 including procedures for handling various basic system services and for performing hardware dependent tasks;

network communication module 312 that is used for connecting server system 108 to other computing devices (e.g., client devices 104) connected to one or more networks 110 via one or more network interfaces 304 (wired or wireless);

server-side module 106, which provides server-side data processing and functionalities for the social networking platform (e.g., providing game ranking information), includes, but is not limited to:

obtaining module 322 for obtaining from a respective client device 104 image(s) of at least a portion of a displayed interface of a game 226 executed by the respective client device 104;

request handling module 324 for receiving a request from respective client device 104 for game history information;

identifying module 326 for, optionally, identifying the game that corresponds to the obtained image(s) of at least the portion of the displayed interface of game 226;

extracting module 328 for extracting game data from the obtained image(s) of at least the portion of the displayed interface of game 226;

determining module 330 for determining game ranking information for the user of respective client device 104 based at least in part on the game data extracted from the obtained image(s) of at least the portion of the displayed interface for game 226, and, optionally, responsive to the request for game history information, for determining game history information corresponding to the user of respective client device 104 from game history database 114; and transmitting module 332 for transmitting to respective client device 104 the determined game ranking information and, optionally, the determined game history information; and server data 340 storing data for the social networking platform, including but not limited to:

game history database 114 storing previously extracted game data; and one or more user profiles 116 storing one or more user profiles each associated with a respective user in the social networking platform, including custom parameters (e.g., age, location, hobbies, etc.) for the respective user, previously determined game ranking information for the respective user, social network contacts associated with the respective user, and identified trends and/or likes/dislikes of the respective user.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 306, optionally, stores a subset of the modules and data structures identified above. Furthermore, memory 306, optionally, stores additional modules and data structures not described above.

In some embodiments, at least some of the functions of the client-side module 102 are performed by the server-side module 106, and the corresponding sub-modules of these functions may be located within the server-side module 106 rather than the client-side module 102. In some embodiments, at least some of the functions of the server-side module 106 are performed by the client-side module 102, and the corresponding sub-modules of these functions may be located within the client-side module 102 rather than the server-side module 106. Client device 104 and server system 108 shown in FIGS. 2-3, respectively, are merely illustrative, and different configurations of the modules for implementing the functions described herein are possible in various embodiments.

Attention is now directed towards embodiments of user interfaces and associated processes that may be implemented on a respective client device 104 with one or more speakers 402 enabled to output sound, zero or more microphones 404 enabled to receive sound input, and a touch screen 406 (sometimes also herein called a touch screen display) enabled to receive one or more contacts and display information (e.g., media content, webpages and/or user interfaces for an application). FIGS. 4A-4F illustrate exemplary user interfaces for providing game ranking information in accordance with some embodiments.

Although some of the examples that follow will be given with reference to inputs on touch screen 406 (where the touch sensitive surface and the display are combined), in some embodiments, the device detects inputs on a touch-sensitive surface that is separate from the display. In some embodiments, the touch sensitive surface has a primary axis that corresponds to a primary axis on the display. In accordance with these embodiments, the device detects contacts with the touch-sensitive surface at locations that correspond to respective locations on the display. In this way, user inputs detected by the device on the touch-sensitive surface are used by the device to manipulate the user interface on the display of the device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

FIGS. 4A-4F show interface 408 displayed on client device 104 (e.g., a mobile phone) for a game and/or a social networking platform; however, one skilled in the art will appreciate that the user interfaces shown in FIGS. 4A-4E may be implemented on other similar computing devices. The user interfaces in FIGS. 4A-4F are used to illustrate the processes described herein, including the process described with respect to FIGS. 6A-6D.

Figure 4A:
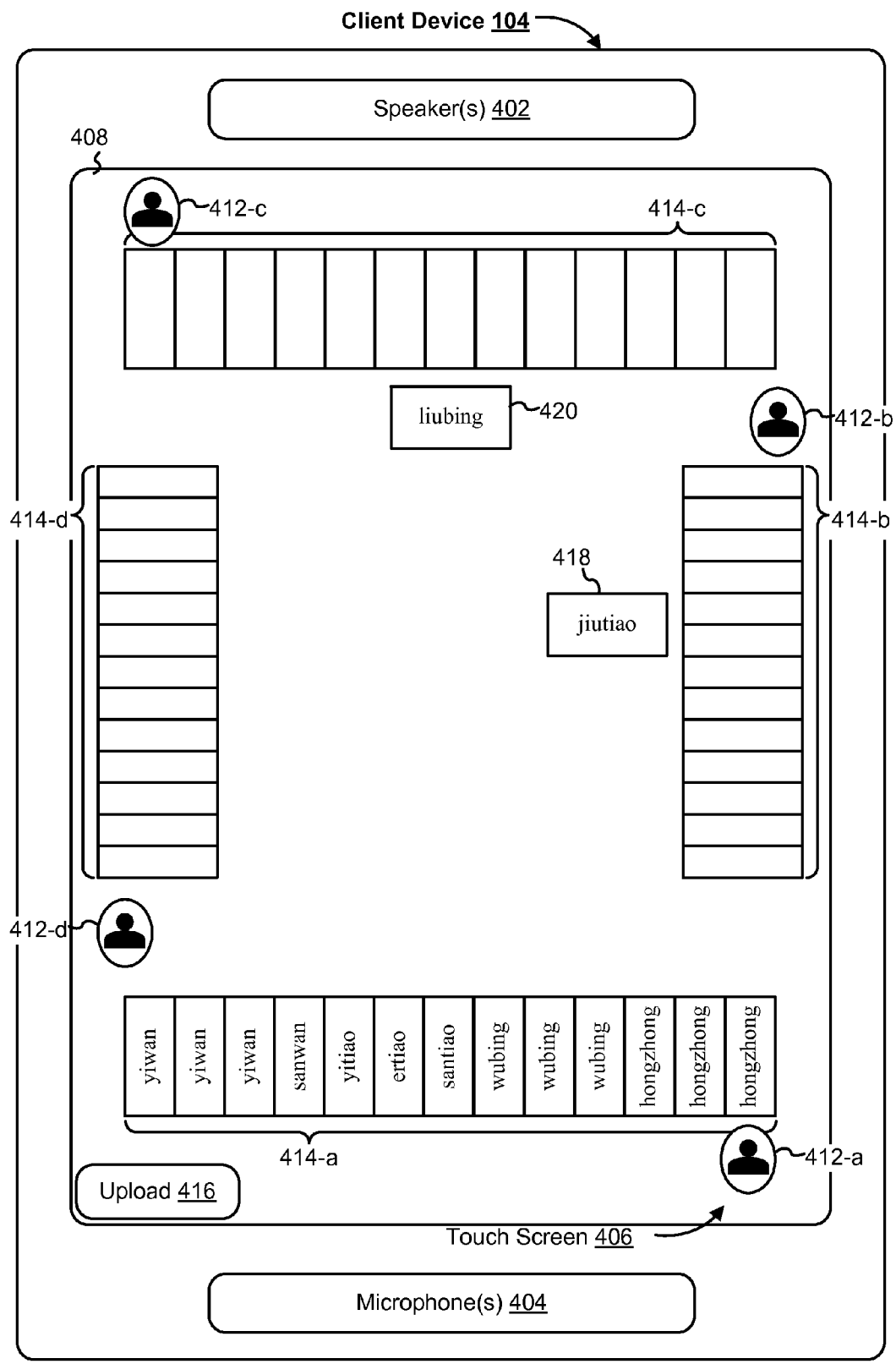
FIGS. 4A-4F illustrate exemplary user interfaces for providing game ranking information in accordance with some embodiments.

FIG. 4A illustrates client device 104 displaying an interface for a Mahjong game on touch screen 406. In FIG. 4A, there are four players 412 playing the Mahjong game. For example, player 412-a is playing an online Mahjong game on client device 104 with other players (e.g., remotely located human players 412-b, 412-c, and 412-d) via a respective game server 122 that coordinates play of the online Mahjong game for players 412. In FIG. 4A, each of players 412 is associated with a set of tiles 414 and is represented by a corresponding in-game avatar (e.g., initials, player number, portrait, selected image, or automatically assigned or default image). FIG. 4A shows a first state of a round of the online Mahjong game where player 412-b started the round playing tile 418 and player 412-c followed by playing tile 420.

FIG. 4A also illustrates client device 104 displaying upload affordance 416. In some embodiments, upload affordance 416 is independent of the online Mahjong game provided by the respective game server 122. In some embodiments, upload affordance 416 corresponds to a social networking platform provided by server system 108 that runs as a background process while the user plays the online Mahjong game. In some embodiments, upload affordance 416, when activated (e.g., by a touch input from the user), causes client device 104 to invoke a screen capture function of the operating system of client device 104 that captures one or more images of at least a portion of the displayed interface of the online Mahjong game, and, also, causes client device 104 to send, to server system 108 (FIGS. 1 and 3), the one or more captured images of at least the portion of the displayed interface of the online Mahjong game for extraction of the game data (e.g., score information). In some embodiments, upload affordance 416, when activated (e.g., by a touch input from the user), optionally causes client device 104 to display an interface associated with the social networking platform (e.g., upload interface 430 in FIG. 4D) prior to invoking the screen capture function.

Figure 4B:
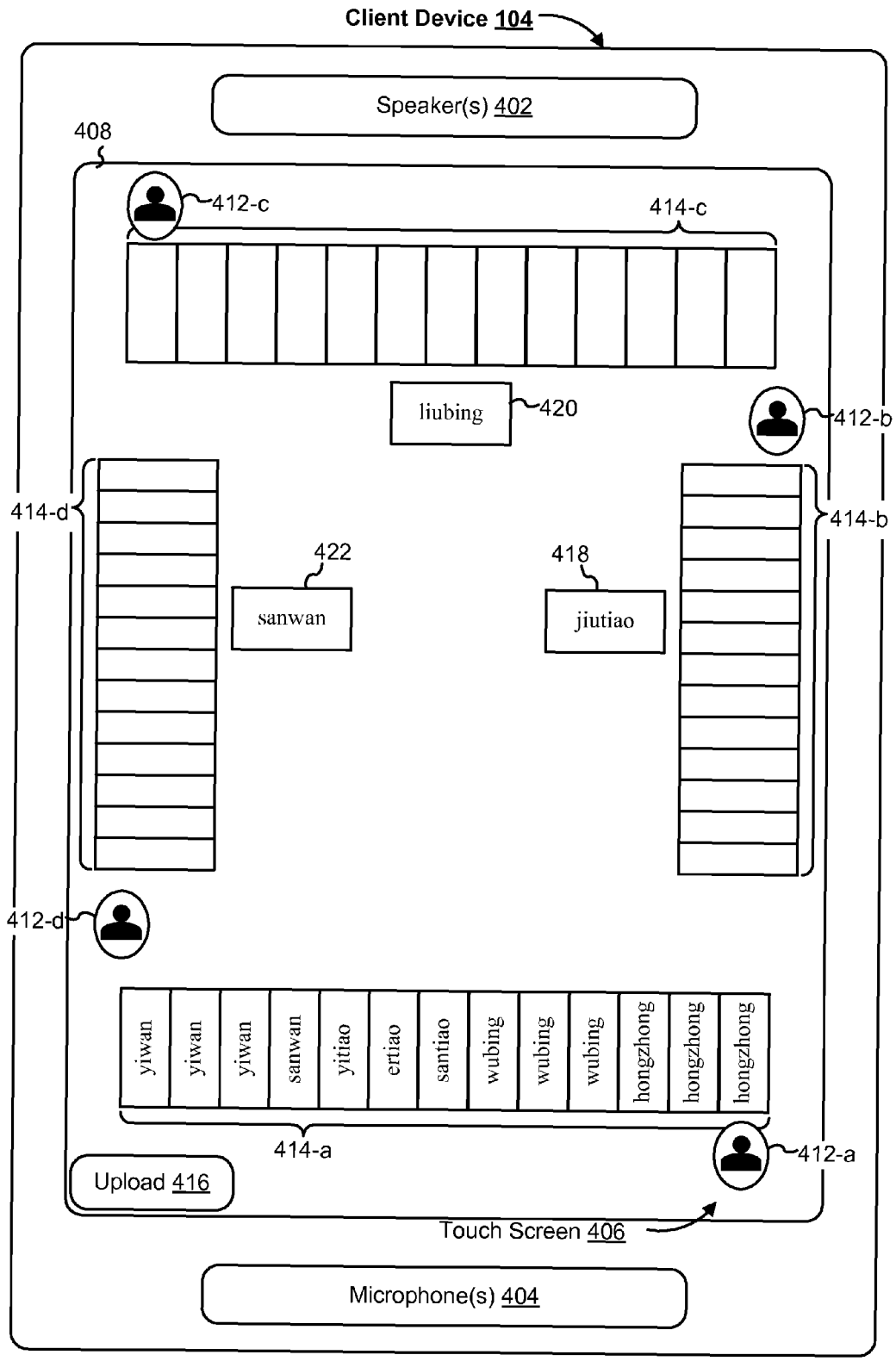

FIG. 4B illustrates client device 104 continuing to display the interface for the Mahjong game on touch screen 406. FIG. 4B shows a second state of the round of the online Mahjong game where player 412-d has played tile 422.

Figure 4C:
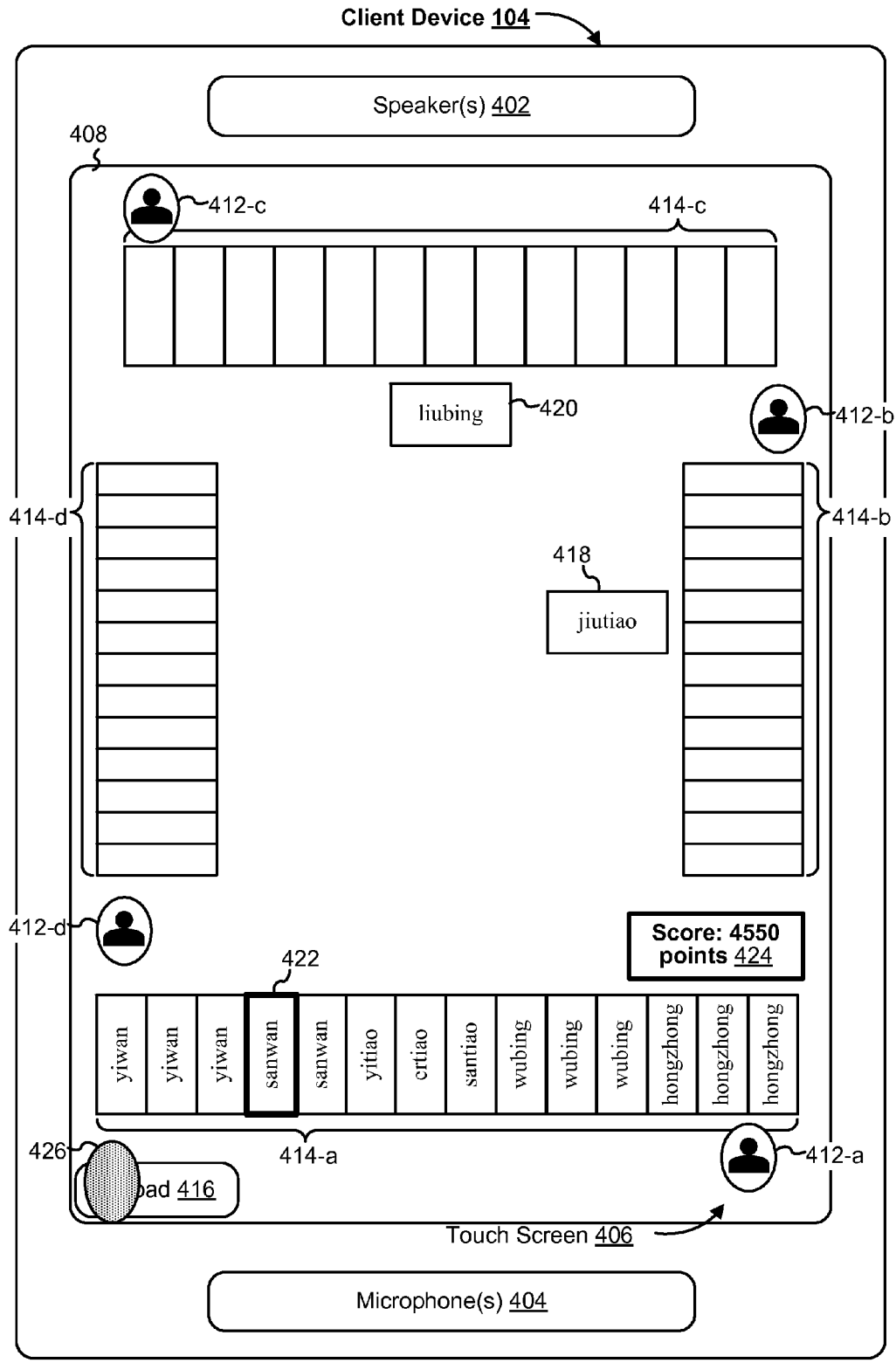

FIG. 4C illustrates client device 104 continuing to display the interface for the Mahjong game on touch screen 406. FIG. 4C shows a third state of the round of the online Mahjong game where player 412-a (e.g., the user associated with client device 104) has collected tile 422 to complete his/her set of tiles 414-a (e.g., a meld) so as to win the round of the online Mahjong game with a score of 4550 points as indicated in dialog box 424. FIG. 4C also illustrates client device 104 detecting contact 426 at a location corresponding to upload affordance 416. For example, in response to detecting selection of upload affordance 416, client device 104 invokes a screen capture function that captures one or more images of at least a portion of the displayed interface of the online Mahjong game, and, also optionally, sends, to server system 108 (FIGS. 1 and 3), the one or more captured images of at least the portion of the displayed interface of the online Mahjong game for extraction of the game data (e.g., the score from dialog box 424).

Figure 4D:
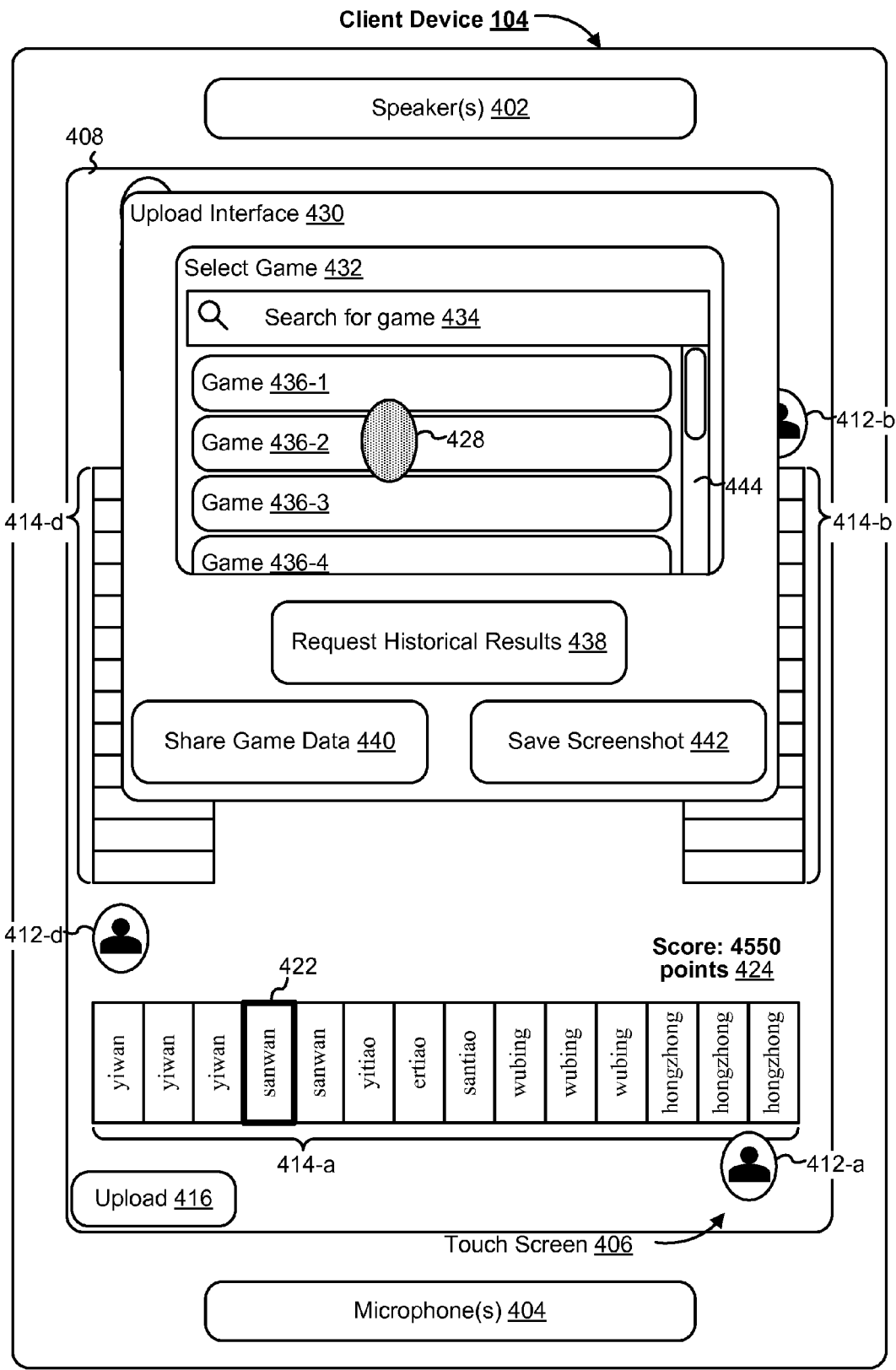

FIG. 4D illustrates client device 104 displaying upload interface 430 over the displayed interface for the Mahjong game in response to detecting selection of upload affordance 416 in FIG. 4C. In some embodiments, upload interface 430 is independent of the online Mahjong game and, instead, corresponds to the social networking platform. In FIG. 4D, upload interface 430 includes game selection interface 432 for selecting the game being currently played by the user of client device 104. In FIG. 4D, game selection interface 432 includes a plurality of game options 436 for selecting the game and scroll bar 444 for scrolling to reveal additional game options 436. In FIG. 4D, game selection interface 432 also includes search box 434 for searching for the game being currently played via a virtual keyboard, physical keys, or voice. In FIG. 4D, upload interface 430 also includes: "Request Historical Results" affordance 438, which, when activated (e.g., by a touch input from the user), causes client device 104 to send a request, to server system 108, for game history information for the user of client device 104; "Share Game Data" affordance 440, which, when activated (e.g., by a touch input from the user), causes client device 104 to share (A) the game data extracted by server system 108 from the one or more captured images of at least the portion of the displayed interface of the online Mahjong game and/or (B) the one or more captured images of at least the portion of the displayed interface of the online Mahjong game via one or more social media resources; and "Save Screenshot" affordance 442, which, when activated (e.g., by a touch input from the user), causes client device 104 to save the one or more captured images of at least the portion of the displayed interface of the online Mahjong game to local and/or remote memory location(s) such as local user data 274, Flickr, Imgur, Dropbox, and the like. In some embodiments, the one or more social media resources include the social networking platform, email, SMS, other communication processes, and/or one or more social media platforms such as FaceBook Twitter, and the like.

FIG. 4D also illustrates client device 104 detecting contact 428 at a location corresponding to game option 436-2. In some embodiments, in response to selection of game option 436-2, client device 104 sends an indication, to server system 108 (FIGS. 1 and 3), of the game corresponding to game options 436-2 and, also, sends, to server system 108, the one or more captured images of at least the portion of the displayed interface of the online Mahjong game for extraction of the game data (e.g., the score from dialog box 424). In this way, extraction of game data, at server system 108, from the one or more captured images of at least the portion of the displayed interface of the online Mahjong game is made faster and more efficient because server system 108 is supplied with an indication that the one or more captured images correspond to the online Mahjong game. In some other embodiments, in response to selection of game option 436-2, client device 104 selects a mask for the game corresponding to selected game option 436-2 and overlays the mask on the displayed interface for the game prior to capturing the one or more images.

Figure 4E:
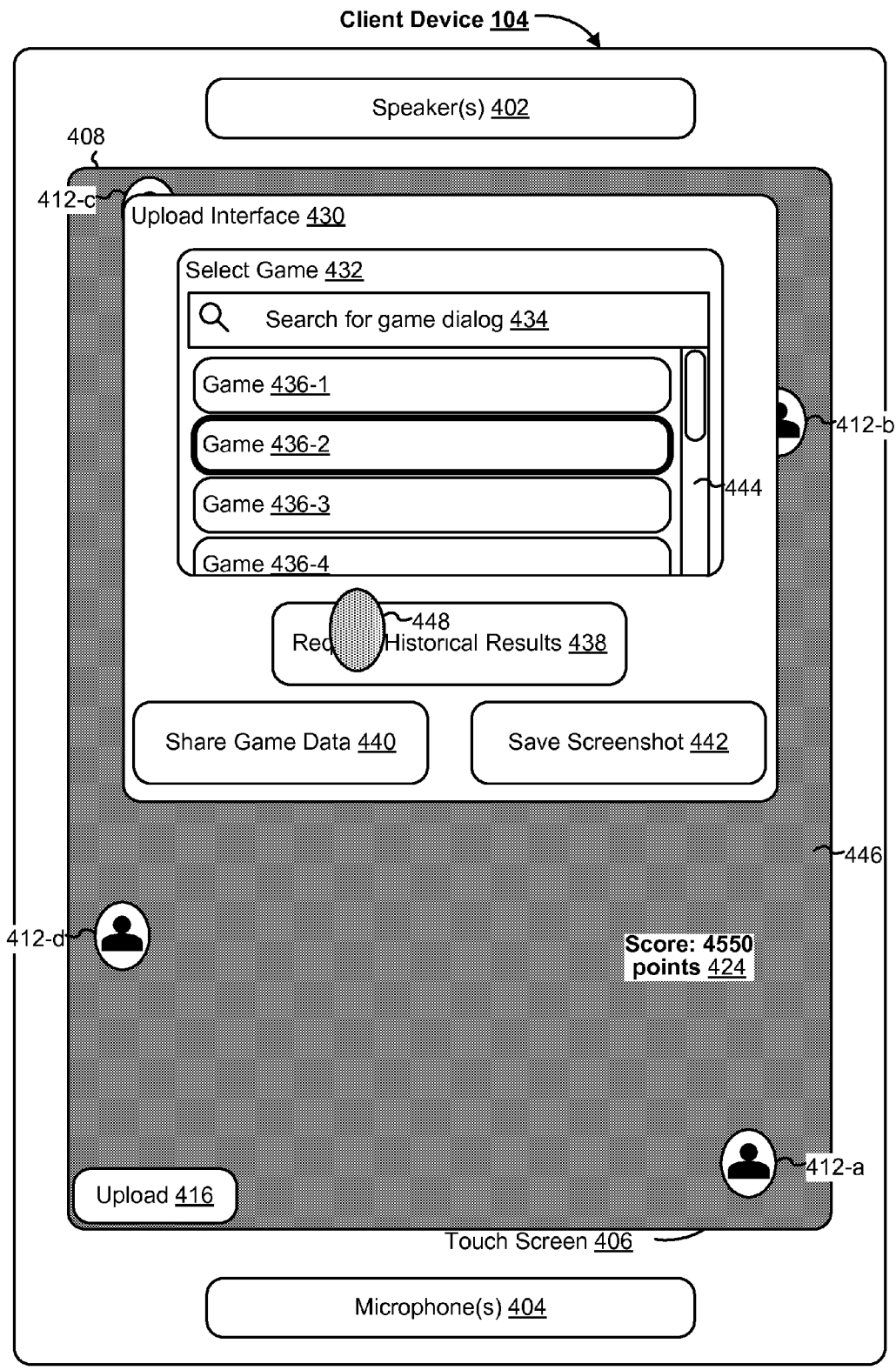

FIG. 4E illustrates client device 104 continuing to display upload interface 430 over the displayed interface for the Mahjong game. In FIG. 4E, a mask that corresponds to the Mahjong game has been displayed over the interface for the Mahjong game in response to detecting selection of game option 436-2 in FIG. 4D. In FIG. 4E, the mask is monochromatic and exposes the portions of the interface for the Mahjong game that include the game data (i.e., dialog box 424 and the in-game avatars for players 412). FIG. 4E also illustrates client device 104 detecting contact 448 at a location corresponding to "Request Historical Results" affordance 438. For example, in response to detecting selection of "Request Historical Results" affordance 438, client device 104 sends a request, to server system 108, for game history information corresponding to the user of client device 104.

Figure 4F:
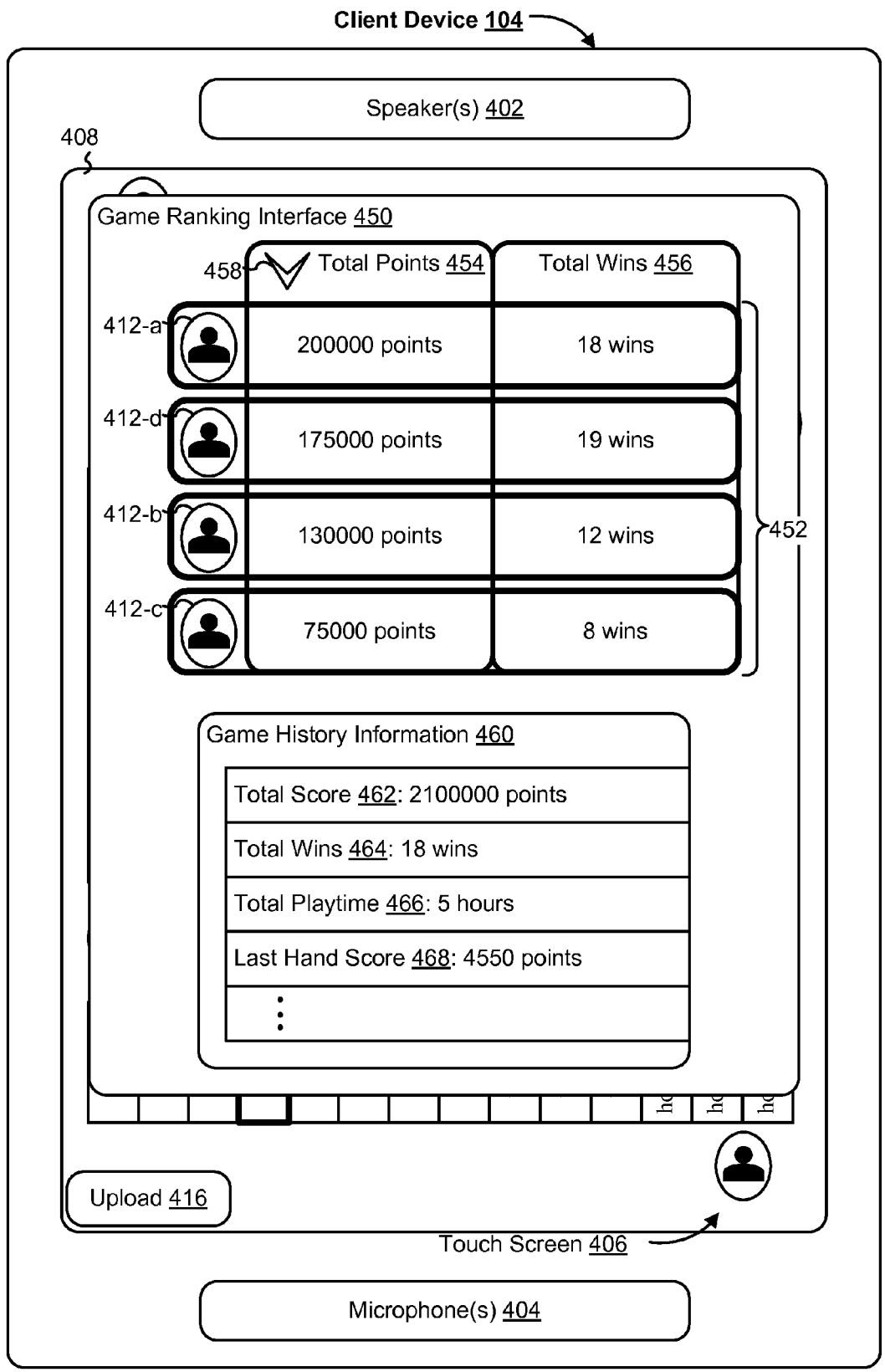

FIG. 4F illustrates client device 104 displaying game ranking interface 450 over the displayed interface for the Mahjong game. For example, client device 104 receives game ranking information, from server system 108, after sending the one or more images of at least the portion of the displayed interface of the online Mahjong game to server system 108 for extraction of game data. In some embodiments, game ranking interface 450 is independent of the online Mahjong game and, instead, corresponds to the social networking platform. In FIG. 4F, game ranking interface 450 includes a set of rankings 452 corresponding to the online Mahjong game for players 412 with two columns of game data: total points column 454 and total wins column 456. In FIG. 4F, sorting indicator 458 indicates that the set of rankings 452 are sorted according to total points for all games played between players 412. In some embodiments, the user of client device 104 is able to sort the set of rankings 452 by total wins by selecting total wins column 456. In FIG. 4F, the set of rankings 452 includes the in-game avatar for each of players 412.

FIG. 4F also illustrates client device 104 displaying game history information 460 in game ranking interface 450. For example, client device 104 receives game history information, from server system 108, after sending the request for game history information in response to selection of Request Historical Results" affordance 438 in FIG. 4E. In FIG. 4F, game history information 460 associated with the user of client device 104 includes historical and accumulated game data for all sessions of the online Mahjong game (i.e., not merely sessions/games with players 412) such as total score 462, total wins 464, total playtime 466, last hand score 468, and so on.

Figure 5:
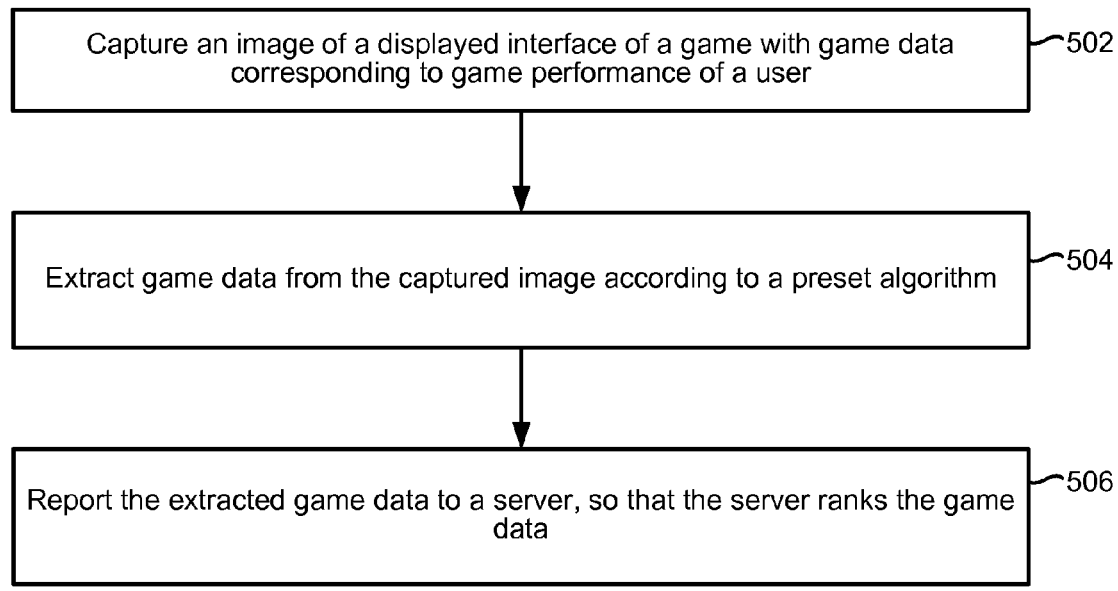
FIG. 5 is a flowchart diagram of a method of providing game data in accordance with some embodiments.
Figure 6A:
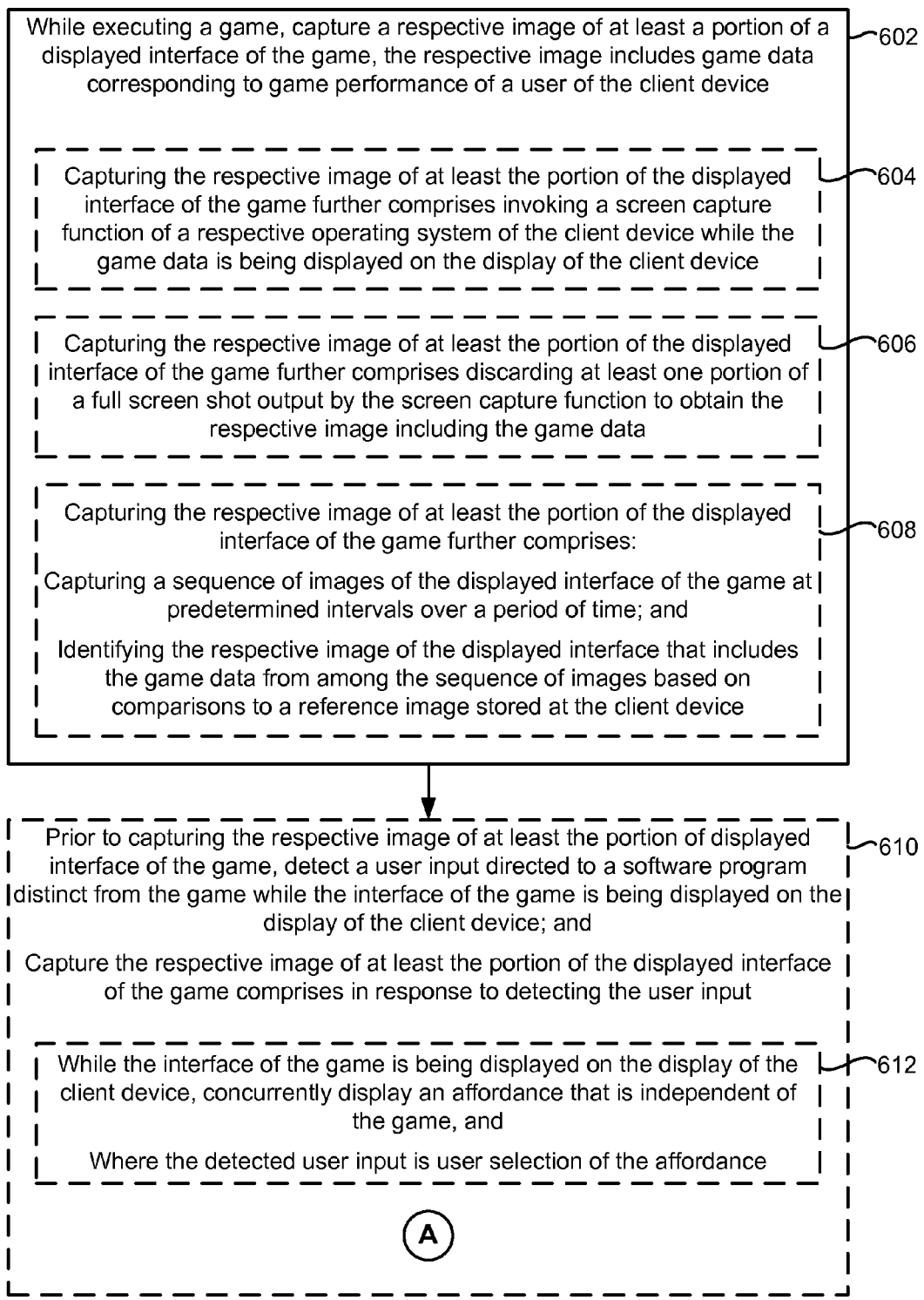
FIGS. 6A-6D illustrate a flowchart diagram of a client-side method of providing game ranking information in accordance with some embodiments.
Figure 6B:
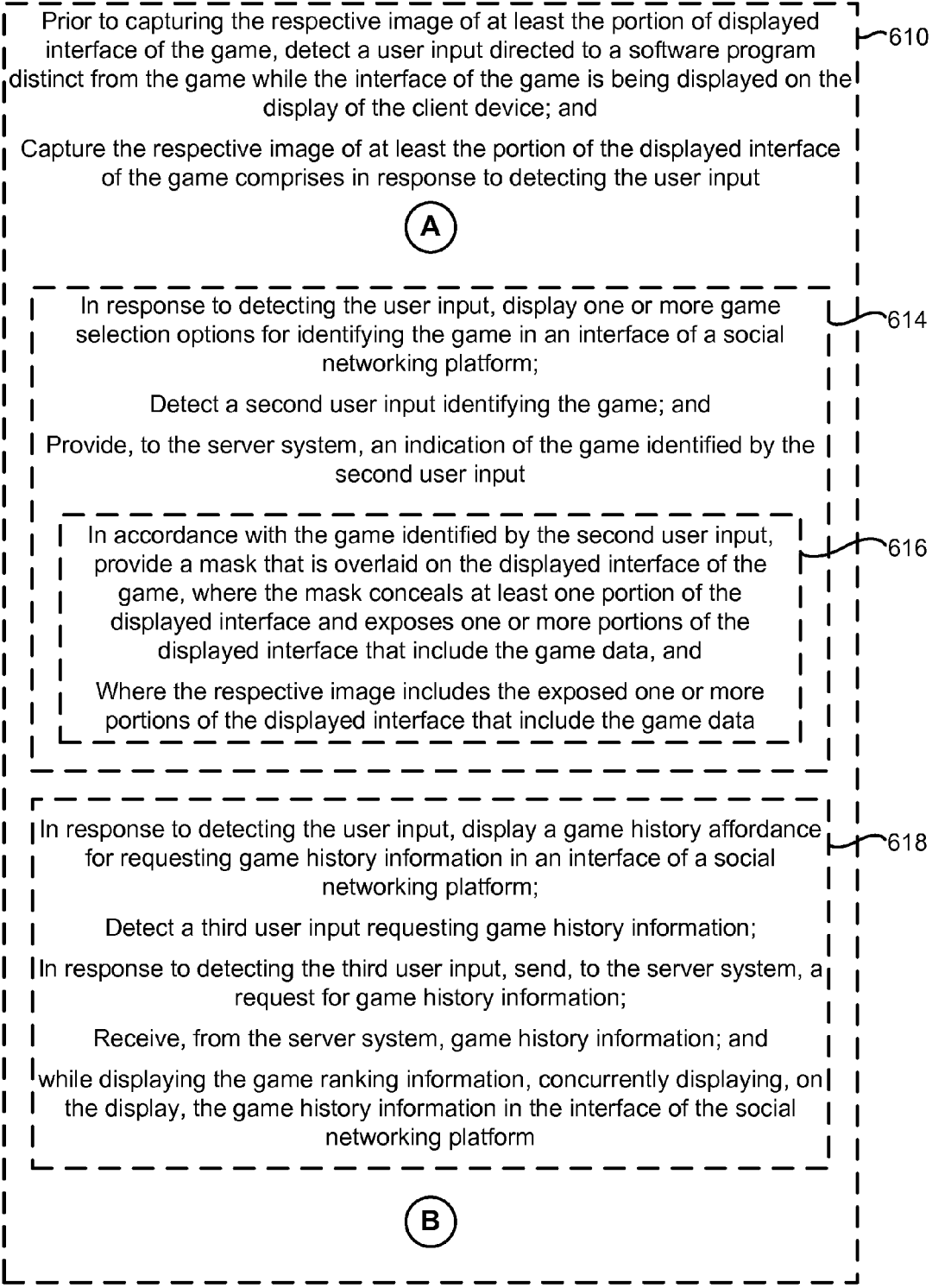
Figure 6C:
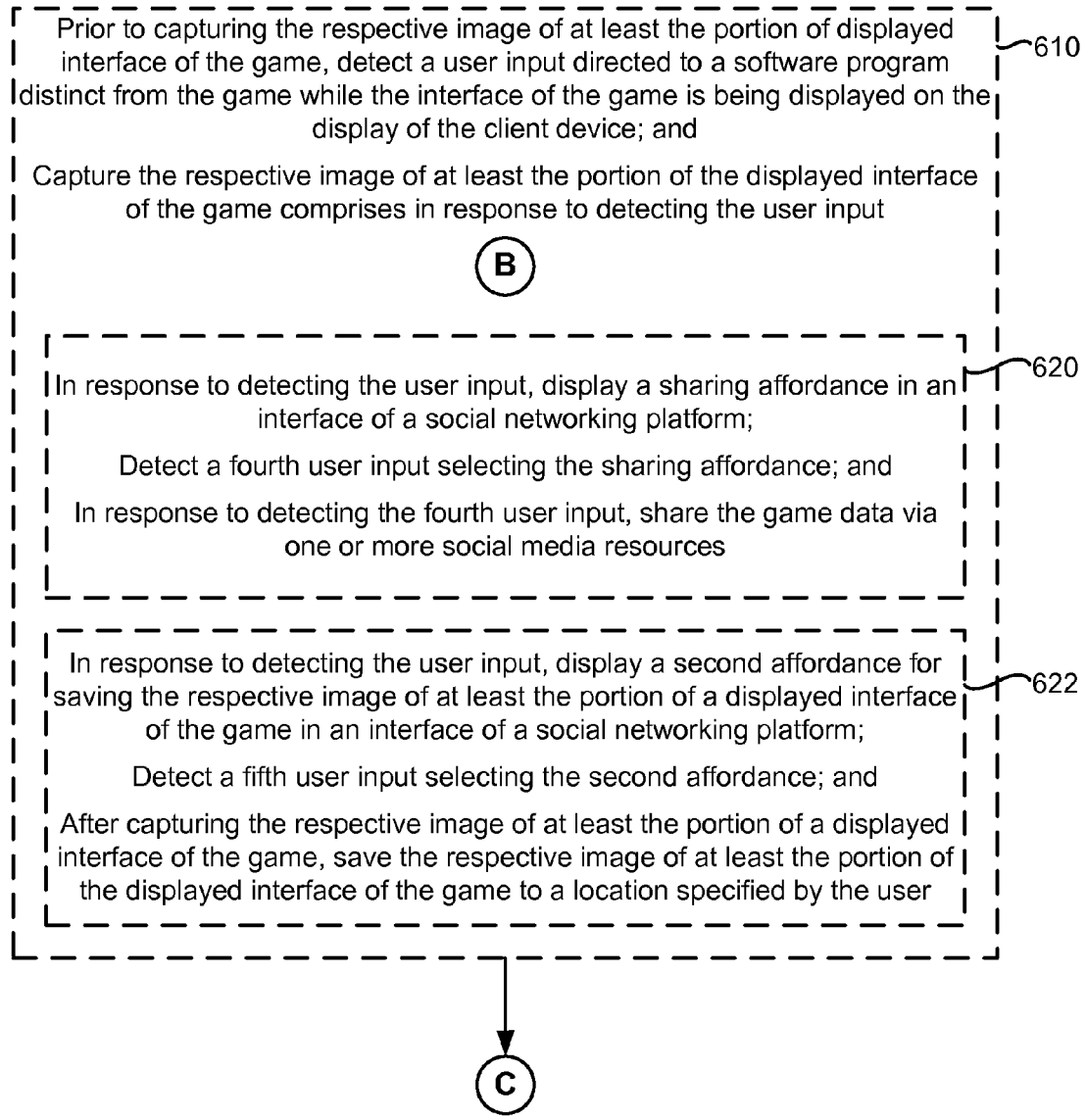
Figure 6D:
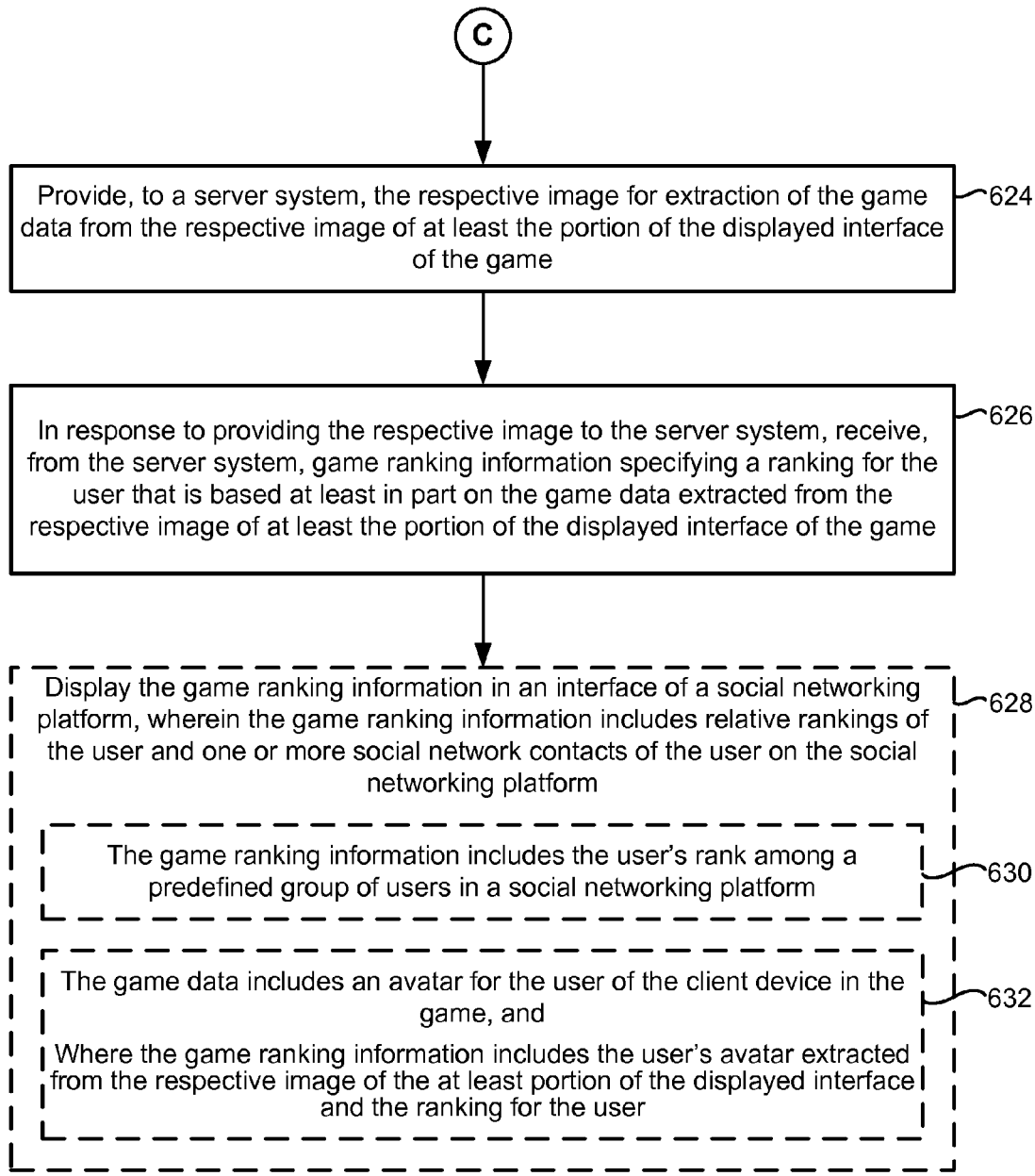

FIG. 5 illustrates a flowchart diagram of a method of providing game data in accordance with some embodiments. In some embodiments, method 500 is performed by an electronic device with one or more processors and memory. For example, in some embodiments, method 500 is performed by a mobile device (e.g., client device 104, FIGS. 1-2) or a component thereof (e.g., client-side module 102, FIGS. 1-2). In some embodiments, method 500 is governed by instructions that are stored in a non-transitory computer readable storage medium and the instructions are executed by one or more processors of the electronic device. Optional operations are indicated by dashed lines (e.g., boxes with dashed-line borders).

The client device captures (502) an image of the displayed interface of a game that includes game data corresponding to game performance of a user of the client device. For example, while playing a game there are many display interfaces, but a display interface of game with game data (e.g., a score or other game-play statistics) is typically displayed after completing a level or finishing the game. In some embodiments, client device 104 captures an image of the displayed interface of the game with the game data in response to invocation of a screen capture function or continuously during game-play.

The client device extracts (504) the game data from the captured image according to a preset algorithm. In some embodiments, client device 104 extracts game data from the captured image of the displayed interface of the game. For example, the game data includes a score for a level of the game for the user of client device 104 such as 1000 points, 2000 points, 23000 points and other specific values.

The client device reports (506) the extracted game data to a server, so that the server ranks the game data. For example, after the client device reports the extracted game data to the server, the server ranks the user of the client device according to the received game data. As such, the user can clearly know his ranking, thereby stimulating the user to improve his score.

For example, when playing Landlords, a user's score is increased or deducted after one round, and the user's score is displayed after a round ends (e.g., 4500 points). In this example, the displayed interface of the game with the score is captured, and the game data including the score is extracted from the displayed interface of the game. Continuing with this example, the game data is reported to a server, and the server ranks the user with respect to other users playing the game (e.g., Landlords) to give the user an accurate ranking position, thereby improving user experience. For example, the user's ranking is 245 based on the score of 4500 points.

In this embodiment, the client device captures an image of the displayed interface of the game, extracts game data from the captured image according to a preset algorithm, and reports the game data to a server. Compared with the high complexity of the game score acquisition process in the prior art, in the method according to this embodiment, a client device acquires game data without reporting the game data to a platform, thereby reducing the complexity of the client device's acquisition of the game data.

In some embodiments, the capturing aspect in step (502) optionally includes: (A) receiving a screenshot instruction indicated by an input from a user of the client device; and (B) invoking the screen capture function to capture the displayed interface of the game with the game data in response to the screenshot instruction.

In this embodiment, the client device reports game data to the server after receiving the input from the user. In some embodiments, a floating window or affordance is displayed adjacent to or overlaid on the displayed interface of the game. For example, the floating window or affordance is small or discrete enough so as not to affect the user's game experience. When the displayed interface of the game includes game data (e.g., upon completion of a level of the game) and the user wishes to report the game data, the user is able to click the floating window or affordance so as to trigger the screen shot function to capture an image of the displayed interface of the game with the game data. Subsequently, the client device extracts the game data from the captured image of the displayed interface of the game. In this way, computation resources of the client device are maximized by only capturing a screen shot and extracting game data in response to a user input.

In some embodiments, the capturing aspect in step (502) optionally includes: (A) capturing images of multiple displayed interfaces of the game, and matching the displayed interfaces of the game in the captured images with a preset game data display interface of the game; and (B) determining a respective image of the displayed interface of the game from the captured images of the displayed interfaces of the game with similar features to the features of the preset game data display interface of the game within a predetermined accuracy threshold, and, in accordance with a determination that the respective displayed interface satisfies the predetermined accuracy threshold, identifying the respective image of the displayed interface as the displayed interface with the game data. As such, the user of the client device is not required to initialize the screen capture function.

According to this embodiment, the client device continuously captures images of the displayed interfaces of the game, and then matches each displayed interface with a preset game data display interface of the game. If a respective image of the displayed interface from the captured images of the displayed interface of the game matches the preset game data display interface of the game within the predetermined accuracy threshold (e.g., 80%, 90%, etc. of the features of the two interfaces match), the client device identifies the respective image of the displayed interface of the game as the displayed interface with the game data.

In some embodiments, the extracting aspect in step (504) includes: extracting the game data from the captured image of the displayed interface of the game according to an artificial neural network algorithm. In some embodiments, the artificial neural network algorithm is trained based on predefined eigenvalue learning parameters of the game.

In this embodiment, the game data extraction process is actually a pattern recognition process. Such pattern recognition is a supervision-based machine learning algorithm. In terms of a respective game, a programmer may acquire a large number of images of displayed interfaces of the game with various game data during development, and artificially assigns points to the displayed interfaces in the images. In some embodiments, the machine learning program uses an artificial neural network algorithm to calculate corresponding eigenvalue learning parameters of the respective game with respect to eigenvalues such as pixels of the displayed interface and the artificially assigned points. The artificial neural network algorithm can be adopted to use the eigenvalue learning parameters to perform operation with the eigenvalues, such as the pixels of the displayed interface with the game data, so as to obtain the game data from the displayed interface with the game data.

In some embodiments, the extracting aspect in step (504) includes: extracting the game data from the captured image of the displayed interface of the game according to a support vector machine algorithm. In some embodiments, the support vector machine algorithm is trained based on predefined eigenvalue learning parameters of the game.

In this embodiment, the game data extraction process is actually a pattern recognition process. Such pattern recognition is a supervision-based machine learning algorithm. In terms of a respective game, a programmer may acquire a large number of images of displayed interfaces of the game with various game data during development, and artificially assigns points to the displayed interfaces in the images. In some embodiments, the machine learning program uses a support vector machine algorithm to calculate corresponding eigenvalue learning parameters of the respective game with respect to eigenvalues such as pixels of the displayed interface and the artificially assigned points. The support vector machine algorithm can be adopted to use the eigenvalue learning parameters to perform operation with the eigenvalues, such as the pixels of the displayed interface with the game data, so as to obtain the game data from the displayed interface with the game data.

The above embodiments mention the artificial neural network algorithm and the support vector machine algorithm, but, in fact, an eigenvalue algorithm may also be used for the extraction process. Each of these algorithms can be summarized as a machine learning (or pattern recognition) algorithms. In fact, the eigenvalue learning parameters for each game are pre-calculated by research and development personnel, and then are preset in the game. After installing the game, the client device can acquire the eigenvalue learning parameters. Furthermore, the specific algorithm for calculation is also pre-specified by the research and development personnel, and preset in the game. Therefore, the eigenvalue learning parameters of each game and the algorithm to be used are preset, and, after installation of the game, the client device may perform direct extraction of the game data from captured images of the displayed interfaces of the game.

FIGS. 6A-6D illustrate a flowchart diagram of a client-side method of providing game ranking information in accordance with some embodiments. In some embodiments, method 600 is performed by an electronic device with one or more processors, memory, and a display. For example, in some embodiments, method 600 is performed by a mobile device (e.g., client device 104, FIGS. 1-2) or a component thereof (e.g., client-side module 102, FIGS. 1-2). In some embodiments, method 600 is governed by instructions that are stored in a non-transitory computer readable storage medium and the instructions are executed by one or more processors of the electronic device. Optional operations are indicated by dashed lines (e.g., boxes with dashed-line borders).

While executing a game, the client device captures (602) a respective image of at least a portion of a displayed interface of the game, the respective image includes game data corresponding to game performance of a user of the client device. In some embodiments, the one or more images pertain to a game session of the game such as a level of a PC/console game, a single hand of a card game, or the end result of a game. In some embodiments, the game data is an end of game or post-level completion report displayed to the user the client device 104. For example, for a racing game, the game data includes overall time, lap split times, and/or the like. In another example, for a shooting game (e.g., Call of Duty or Halo), the game data includes an accuracy percentage, kill-to-death ratio, killing streak, total kills, average life span, longest life span, and/or the like. In another example, for a role playing game (e.g., World of Warcraft), the game data includes total damage done, damage-per-second, total healing done, healing-per-second, boss damage, boss kill time, and/or the like. In another example, for a card game (e.g., Hearts or Spades), the game data includes average score per hand, past hand score, total score, and/or the like.

In some embodiments, capturing the respective image of at least the portion of the displayed interface of the game further comprises invoking (604) a screen capture function of a respective operating system of the client device while the game data is being displayed on the display of the client device. In FIG. 4C, for example, client device 104 captures an image of the displayed interface for the Mahjong game in response to detecting selection of upload affordance 416 with contact 426. In FIG. 4C, the displayed interface for the Mahjong game includes dialog box 424 with player 412-a's score for the round of the Mahjong game (i.e., the game data).

In some embodiments, capturing the respective image of at least the portion of the displayed interface of the game further comprises discarding (606) at least one portion of a full screen shot output by the screen capture function to obtain the respective image including the game data. In some embodiments, after invoking the screen capture function to capture and image of the displayed interface of the game, client device 104 or a component thereof (e.g., pre-processing module 236, FIG. 2) discards one or more non-essential portions of the captured image that do not included game data. As such, client device 104 only sends the portion(s) of the captured image that include game data.

In some embodiments, capturing the respective image of at least the portion of the displayed interface of the game further comprises (608): capturing a sequence of images of the displayed interface of the game at predetermined intervals over a period of time; and identifying the respective image of the displayed interface that includes the game data from among the sequence of images based on comparisons to a reference image stored at the client device. In some embodiments, while the user of client device 104 is playing a game, client device 104 captures a sequence of images of the displayed interface of the game. Client device 104 or a component thereof (e.g., pre-processing module 236, FIG. 2) identifies an image in the captured sequence of images that includes game data by comparing images in the sequence of images against a reference image including the game data. In some other embodiments, client device 104 sends the sequence of images of the displayed interface of the game to server system 108, and server system 108 analyzes the sequence of images to identify the image with the game data.

In some embodiments, prior to capturing the respective image of at least the portion of displayed interface of the game, the client device detects (610) a user input directed to a software program distinct from the game while the interface of the game is being displayed on the display of the client device, and the client device captures the respective image of at least the portion of the displayed interface of the game in response to detecting the user input. In some embodiments, server system 108 provides a social networking platform that is independent of the game provided (e.g., which is sometimes provided by a game server 122). As such, there is no communication between the game and server system 108. In other words, there is no direct data exchange API between the game and server system 108 nor is there backend data exchange between a game server 122 of the game and server system 108. Thus, the image capture function must either be triggered via a user input or continuously functioning because it does not know when a game session ends or a user has completed a level. For example, the user input is a voice input, a touch input via a UI affordance, a gestural input, an input via a physical button, or the like. In FIG. 4C, for example, client device 104 captures an image of the displayed interface for the Mahjong game in response to detecting selection of upload affordance 416 with contact 426.

In some embodiments, while the interface of the game is being displayed on the display of the client device, the client device concurrently displays (612) an affordance that is independent of the game, where the detected user input is user selection of the affordance. In some embodiments, the affordance is not controlled by the game software program logic and, instead, corresponds to a social networking platform provided by server system 108. In FIGS. 4A-4F, for example, upload affordance 416, which is associated with the social networking platform, is concurrently displayed with the displayed interface for the Mahjong game. In some embodiments, the affordance is overlaid on the displayed interface of the game. However, the affordance is displayed at such a size and in such a way as to take up minimal space so as not interfere with the user's game-play experience.

In some embodiments, the client device (614): displays one or more game selection options for identifying the game in an interface of a social networking platform in response to detecting the user input; detects a second user input identifying the game; and provides, to the server system, an indication of the game identified by the second user input. For example, the second user input is a voice input identifying the game, input via a virtual keyboard, or selection from a drop-down menu of games. In some embodiments, the indication of the game reduces the burden on server-side image recognition. FIG. 4D, for example, shows client device 104 displaying upload interface 430 over the displayed interface of the game. In FIG. 4D, upload interface 430 includes game selection interface 432 for selecting the game being currently played by the user of client device 104. In FIG. 4D, game selection interface 432 includes a plurality of game options 436 for selecting the game and scroll bar 444 for scrolling to reveal additional game options 436. In FIG. 4D, game selection interface 432 also includes search box 434 for searching for the game being currently played via a virtual keyboard, physical keys, or voice. FIG. 4D, for example, also shows client device 104 detecting contact 428 at a location corresponding to game option 436-2 (e.g., game option 436-2 corresponds to the Mahjong game). In some embodiments, in response to selection of game option 436-2, client device 104 sends an indication, to server system 108 (FIGS. 1 and 3), of the game corresponding to game options 436-2 (e.g., the Mahjong game).

In some embodiments, in accordance with the game identified by the second user input, the client device provides (616) a mask that is overlaid on the displayed interface of the game, where the mask conceals at least one portion of the displayed interface and exposes one or more portions of the displayed interface that include the game data, and where the respective image includes the exposed one or more portions of the displayed interface that include the game data. In some embodiments, based on the selected game, the game interface is masked or cropped to reduce the burden on server-side image recognition. In some embodiments, after providing the mask, only game data is exposed from the displayed interface of the game. In some embodiments, it may not be necessary to crop out the portions that are masked. For example, if the mask is monochromatic, client device 104 sends a compressed version of the captured image because the monochromatic masked portion can be removed easily by server system 108.

For example, in response to selection of game option 436-2 in FIG. 4D (e.g., game option 436-2 corresponds to the Mahjong game), client device 104 selects a mask for the Mahjong game and overlays the mask on the displayed interface for the Mahjong game prior to capturing the one or more images of the displayed interface of the Mahjong game. In FIG. 4E, for example, the mask is monochromatic and exposes the portions of the interface for the Mahjong game that include the game data (i.e., dialog box 424 and the avatars for players 412).

In some embodiments, the client device (618): displays a game history affordance for requesting game history information in an interface of a social networking platform in response to detecting the user input; detects a third user input requesting game history information; in response to detecting the third user input, sends, to the server system, a request for game history information; receives, from the server system, game history information; and, while displaying the game ranking information, concurrently displays, on the display, the game history information in the interface of the social networking platform. In FIG. 4D, for example, upload interface 430 includes "Request Historical Results" affordance 438, which, when activated (e.g., by a touch input from the user), causes client device 104 to send a request, to server system 108, for game history information for the user of client device 104. FIG. 4E, for example, shows client device 104 detecting selection of Request Historical Results" affordance 438 with contact 448. For example, in response to detecting selection of "Request Historical Results" affordance 438 in FIG. 4E, client device 104 sends a request, to server system 108, for game history information corresponding to the user of client device 104. Subsequently, client device 104 receives game history information, from server system 108, after sending the request for game history information. FIG. 4F, for example, shows client device 104 displaying game ranking interface 450 over the displayed interface for the Mahjong game. In FIG. 4F, game ranking interface 450 includes game history information 460 with historical and accumulated game data for all of the user's sessions of the Mahjong game (i.e., not merely sessions/games with players 412) such as total score 462, total wins 464, total playtime 466, last hand score 468, and so on.

In some embodiments, the client device (620): displays a sharing affordance in an interface of a social networking platform in response to detecting the user input; detects a fourth user input selecting the sharing affordance; and, in response to detecting the fourth user input, shares the game data via one or more social media resources. In FIG. 4D, for example, upload interface 430 also includes "Share Game Data" affordance 440, which, when activated (e.g., by a touch input from the user), causes client device 104 to share (A) the game data extracted by server system 108 from the one or more captured images of at least the portion of the displayed interface of the online Mahjong game and/or (B) the one or more captured images of at least the portion of the displayed interface of the online Mahjong game via one or more social media resources. For example, the one or more social media resources include the social networking platforms (e.g., associated with upload affordance 416 and upload interface 430), email, SMS, other communication processes, and/or one or more other social media platforms such as FaceBook Twitter, and the like.

In some embodiments, the client device (622): displays a second affordance for saving the respective image of at least the portion of a displayed interface of the game in an interface of a social networking platform in response to detecting the user input; detects a fifth user input selecting the second affordance; and, after capturing the respective image of at least the portion of a displayed interface of the game, saves the respective image of at least the portion of the displayed interface of the game to a location specified by the user. In FIG. 4D, for example, upload interface 430 also includes "Save Screenshot" affordance 442, which, when activated (e.g., by a touch input from the user), causes client device 104 to save the one or more captured images of at least the portion of the displayed interface of the online Mahjong game to a local memory location (e.g., user data 274) and/or remote memory location(s) (e.g., an external memory drive or an image sharing cloud service provider such as, Flickr, Imgur, Dropbox, and the like).

The client device provides (624), to a server system, the respective image for extraction of the game data from the respective image of at least the portion of the displayed interface of the game. For example, with reference to FIG. 4C, in response to detecting selection of upload affordance 416, client device 104 invokes a screen capture function that captures one or more images of at least a portion of the displayed interface of the online Mahjong game and, also, sends, to server system 108 (FIGS. 1 and 3), the one or more captured images of at least the portion of the displayed interface of the online Mahjong game for extraction of the game data (e.g., the score from dialog box 424).

In response to providing the respective image to the server system, the client device receives (626), from the server system, game ranking information specifying a ranking for the user that is based at least in part on the game data extracted from the respective image of at least the portion of the displayed interface of the game. For example, client device 104 receives game ranking information, from server system 108, after sending the one or more images of at least the portion of the displayed interface of the online Mahjong game to server system 108 in response to selection of upload affordance 416 in FIG. 4C. FIG. 4F, for example, shows client device 104 displaying game ranking interface 450 over the displayed interface for the Mahjong game.

In some embodiments, the client device displays (628) the game ranking information in an interface of a social networking platform, wherein the game ranking information includes relative rankings of the user and one or more social network contacts of the user on the social networking platform. In some embodiments, game ranking interface 450 is independent of the online Mahjong game and, instead, corresponds to the social networking platform (e.g., that is also associated with upload affordance 416 and upload interface 430). In FIG. 4F, for example, game ranking interface 450 includes a set of rankings 452 corresponding to the online Mahjong game for players 412 with two columns of game data: total points column 454 and total wins column 456. In FIG. 4F, sorting indicator 458 indicates that the set of rankings 452 are sorted according to total points for all games played between players 412.

In some embodiments, the game ranking information includes (630) the user's rank among a predefined group of users in a social networking platform. For example, the ranking is the user's rank for the game amongst a group of gaming friends (i.e., the predefined group) to which the user belongs (e.g., players 412 in FIGS. 4A-4F or a superset of players 412). In FIG. 4F, for example, game ranking interface 450 includes a set of rankings 452 corresponding to all games of the online Mahjong game played between players 412. In some embodiments, the predefined group is a hardware-independent social network group that is different from the social network provided by the game or gaming platform. For example, a single game can have multiple platforms for different types of hardware; however, while respect to the social network platform, the predefined group of users is established based on their social network relationships, rather than what types of hardware they use for playing the game.

In some embodiments, the game data includes (632) an avatar for the user of the client device in the game, and where the game ranking information includes the user's avatar extracted from the respective image of the at least portion of the displayed interface and the ranking for the user. For example, server system 108 extracts in-game avatars for players 412 from the one or more captured images and associates the extracted in-game avatars with player 412's scores/statistics in the game ranking information. FIG. 4F, for example, shows game ranking interface 450 with the set of rankings 452 that include the extracted in-game avatar for each of players 412.

Figure 7:
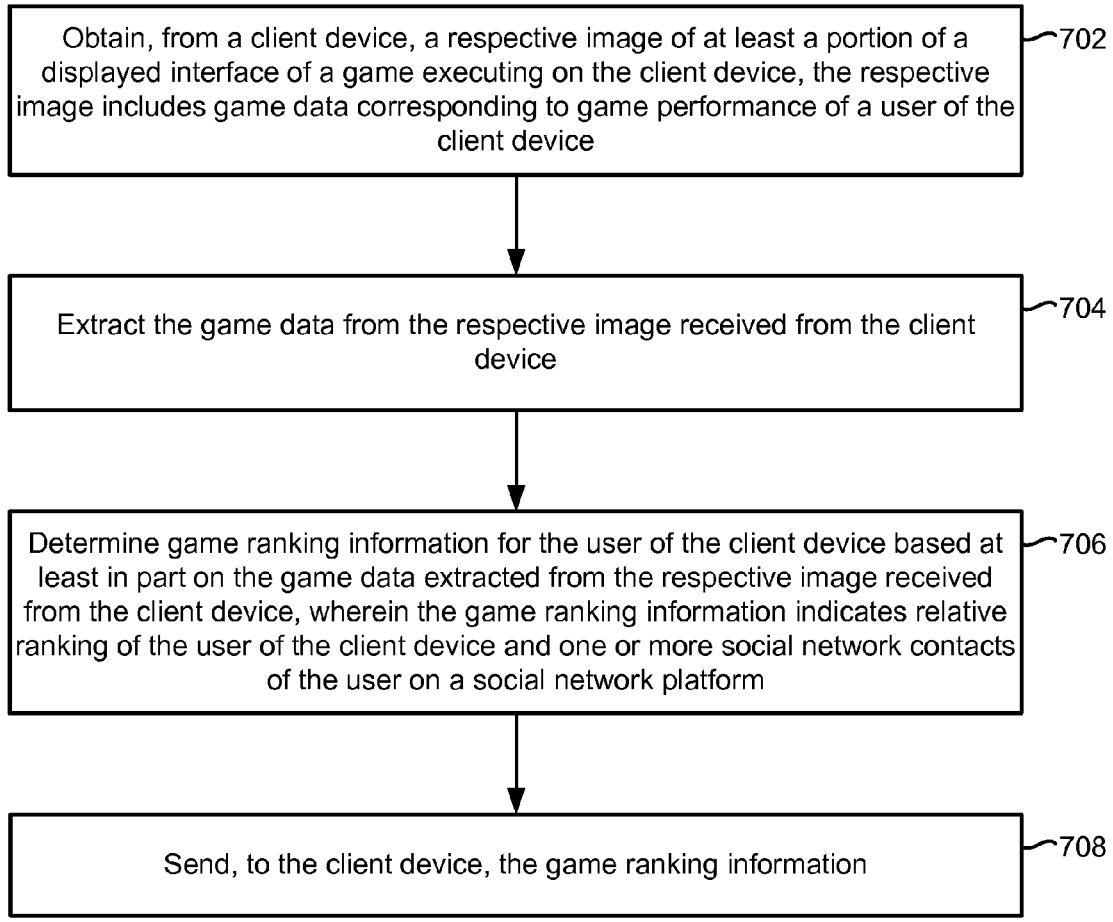
FIG. 7 illustrates a flowchart diagram of a server-side method of providing game ranking information in accordance with some embodiments.

FIG. 7 illustrates a flowchart diagram of a server-side method of providing game ranking information in accordance with some embodiments. In some embodiments, method 700 is performed by a computer system with one or more processors and memory. For example, in some embodiments, method 700 is performed by a server (e.g., server system 108, FIGS. 1 and 3) or a component thereof (e.g., server-side module 106, FIGS. 1 and 3). In some embodiments, method 700 is governed by instructions that are stored in a non-transitory computer readable storage medium and the instructions are executed by one or more processors of the server. Optional operations are indicated by dashed lines (e.g., boxes with dashed-line borders).

The server system obtains (702), from a client device, a respective image of at least a portion of a displayed interface of a game executing on the client device, the respective image includes game data corresponding to game performance of a user of the client device. In some embodiments, server system 108 provides a social networking platform that is independent of the online Mahjong game. For example, upload affordance 416 in FIGS. 4A-4F, upload interface 430 in FIGS. 4C-4E, and game ranking interface 450 in FIG. 4F are all associated with the social networking platform.

For example, with reference to FIG. 4C, in response to detecting selection of upload affordance 416, client device 104 invokes a screen capture function that captures one or more images of at least a portion of the displayed interface of the online Mahjong game and, also, sends, to server system 108 (FIGS. 1 and 3), the one or more captured images of at least the portion of the displayed interface of the online Mahjong game for extraction of the game data (e.g., the score from dialog box 424). In some embodiments, server system 108 also receives an indication of the game corresponding to the one or more captured images.

The server system extracts (704) the game data from the respective image received from the client device. For example, server system 108 extracts the score in dialog box 424 of FIG. 4C from the one or more images of the displayed interface of the Mahjong game. In some embodiments, server system 108 or a component thereof (e.g., extracting module 328, FIG. 3) extracts the game data by performing image processing on the one or more captured images to filter out non-essential portions of the one or more captured images that do not include game data.

The server system determines (706) game ranking information for the user of the client device based at least in part on the game data extracted from the respective image received from the client device, where the game ranking information indicates relative ranking of the user of the client device and one or more social network contacts of the user on a social network platform. In some embodiments, server system 108 or a component thereof (e.g., determining module 330, FIG. 3) determines game ranking information for the user of client device 104 relative to one or more social network contacts of the user on the social network platform based on the extracted game data and, optionally, previously extracted game data associated with the user and the one or more social network contacts of the user in game history database 114.

The server system sends (708) the game ranking information to the client device for display in an interface of a social networking platform that is independent of the game. In some embodiments, the game ranking information is displayed at the client device in an interface of a social networking platform that is independent of the game. For example, server system 108 sends game ranking information (e.g., displayed in game ranking interface 450 in FIG. 4F) includes a set of rankings 452 corresponding to all games of the online Mahjong game played between players 412. In some embodiments, game ranking interface 450 is independent of the online Mahjong game and, instead, corresponds to the social networking platform associated provided by server system 108 (e.g., that is also associated with upload affordance 416 and upload interface 430).

Figure 8A:
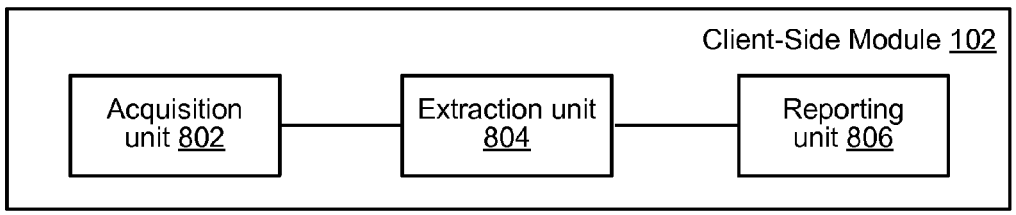
FIGS. 8A-8C illustrate schematic diagrams of a client-side module in accordance with some embodiments.
Figure 8B:
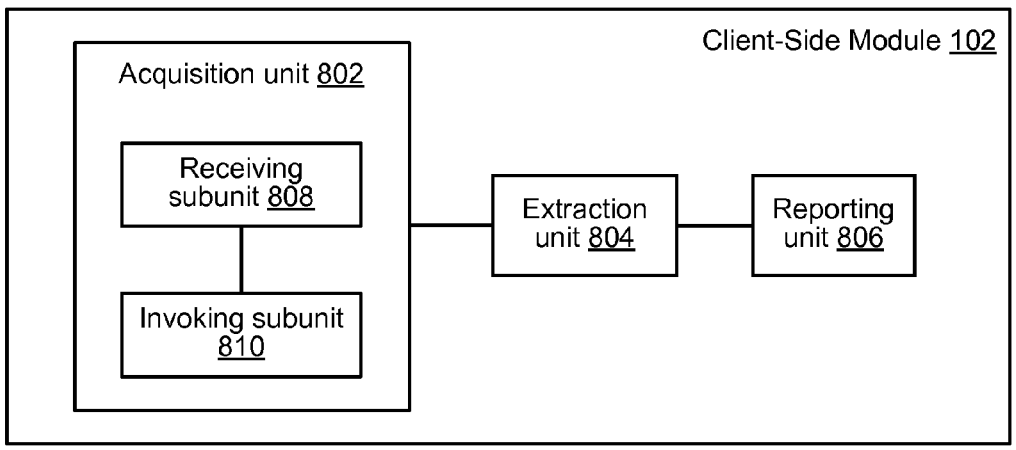
Figure 8C:
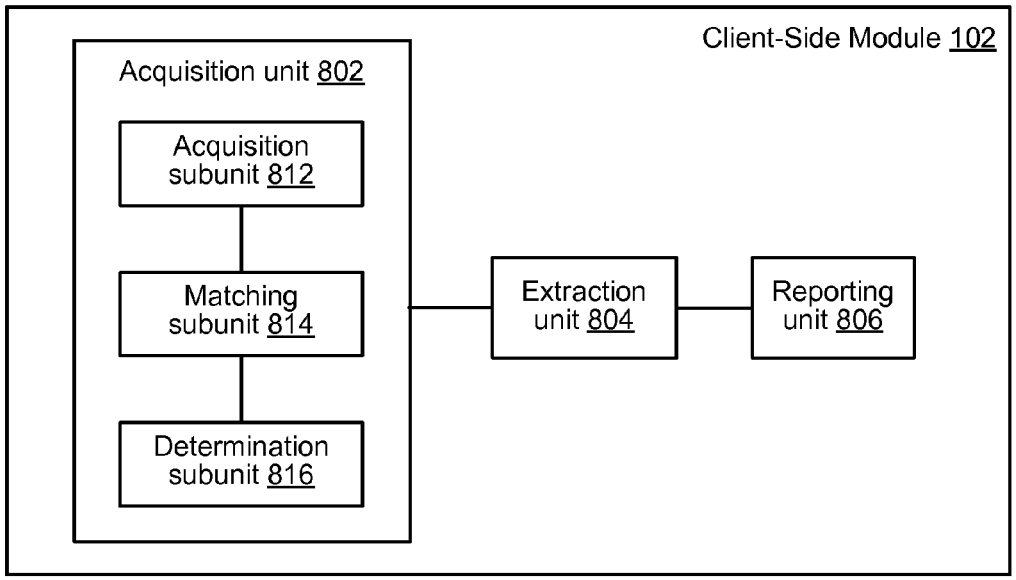

FIGS. 8A-8C illustrate schematic diagrams of client-side module 102 in accordance with some embodiments.

In FIG. 8A, client-side module 102 includes: (A) acquisition unit 802 for capturing image(s) of a displayed interface of a game that includes game data; (B) extraction unit 804 for extracting, according to a preset algorithm, the game data from the captured image of the displayed interface of the game with game data that was acquired by acquisition unit 802; and (C) reporting unit 806 for reporting to a server the game data extracted by extraction unit 804, so that the server ranks the game score data. In this embodiment, compared with the high complexity of the game score acquisition process in the prior art, client-side module 102 acquires game data without reporting the game data to a platform, thereby reducing the complexity of acquiring the game data.

In FIG. 8B, acquisition unit 802 of client-side module 102 includes: (i) receiving subunit 808 for receiving a screenshot instruction indicated by an input from a user of the client device; and (ii) invoking subunit 810 for invoking a screen capture function of the client device to capture the displayed interface of the game with the game data in response to the screenshot instruction received by receiving subunit 808.

In FIG. 8C, acquisition unit 802 of client-side module 102 includes: (i) acquisition subunit 812 for capturing images of multiple displayed interfaces of the game; (ii) matching subunit 814 for matching the displayed interfaces of the game in the captured images with a preset game data display interface of the game; and (iii) determination subunit 816 for determining a respective image of the displayed interface of the game from the captured images of the displayed interfaces of the game with similar features to the features of the preset game data display interface of the game within a predetermined accuracy threshold, and, in accordance with a determination that the respective displayed interface satisfies the predetermined accuracy threshold, identifying the respective image of the displayed interface as the displayed interface with the game data.

Optionally, in some embodiments, on the basis of any one of the above embodiments of client-side module 102, extraction unit 804 is used to extract game data from the captured image of the displayed interface of the game with game data that was acquired by acquisition unit 802 according to an artificial neural network algorithm trained based on predefined eigenvalue learning parameters of the game.

Optionally, in some embodiments, on the basis of any one of the above embodiments of client-side module 102, extraction unit 804 is used to extract game data from the captured image of the displayed interface of the game with game data that was acquired by acquisition unit 802 according to a support vector machine algorithm trained based on predefined eigenvalue learning parameters of the game.

While particular embodiments are described above, it will be understood it is not intended to limit the application to these particular embodiments. On the contrary, the application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

What is claimed is:

1. A method of providing game ranking information, comprising:
   at a client device with one or more processors, memory, and a display:
      while a game is executing on the client device, capturing a respective image of at least a portion of a displayed interface of the game, the respective image includes game data corresponding to game performance of a user of the client device, wherein capturing the respective image of at least a portion of the displayed interface of the game includes:
         applying a mask to the displayed interface of the game, wherein the mask includes a first opening at a first location of the mask that corresponds to an avatar of the user in the displayed interface of the game and the mask includes a second opening at a second location of the mask that corresponds to performance data of the user in the displayed interface of the game, and
         capturing an image of the displayed user interface with the applied mask;
      providing, to a server system, the respective image for extraction of the game data from the respective image of at least the portion of the displayed interface of the game; and
      in response to providing the respective image to the server system, receiving, from the server system, game ranking information specifying a ranking for the user that is based at least in part on the game data extracted from the respective image of at least the portion of the displayed interface of the game.

2. The method of claim 1, wherein capturing the respective image of at least the portion of the displayed interface of the game further comprises:
   invoking a screen capture function of a respective operating system of the client device while the game data is being displayed on the display of the client device.

3. The method of claim 2, wherein capturing the respective image of at least the portion of the displayed interface of the game further comprises:
   discarding at least one portion of a full screen shot output by the screen capture function to obtain the respective image including the game data.

4. The method of claim 1, further comprising:
   displaying the game ranking information in an interface of a social networking platform, wherein the game ranking information includes relative rankings of the user and one or more social network contacts of the user on the social networking platform.

5. The method of claim 1, further comprising:
   prior to capturing the respective image of at least the portion of displayed interface of the game, detecting a user input while the interface of the game is being displayed on the display of the client device, the user input being directed to a software program distinct from the game, and
   wherein the respective image of at least the portion of the displayed interface of the game is captured in response to detecting the user input.

6. The method of claim 5, further comprising:
   while the interface of the game is being displayed on the display of the client device, concurrently displaying an affordance that is independent of the game, wherein the detected user input is user selection of the affordance.

7. The method of claim 5, further comprising:
   in response to detecting the user input, displaying one or more game selection options for identifying the game in an interface of a social networking platform;
   detecting a second user input identifying the game; and
   providing, to the server system, an indication of the game identified by the second user input.

8. The method of claim 7, further comprising:
   in accordance with the game identified by the second user input, providing a mask that is overlaid on the displayed interface of the game, wherein the mask conceals at least one portion of the displayed interface and exposes one or more portions of the displayed interface that include the game data, and
   wherein the respective image includes the exposed one or more portions of the displayed interface that include the game data.

9. The method of claim 1, wherein capturing the respective image of the displayed interface of the game that includes the game data further comprises:
   capturing a sequence of images of the displayed interface of the game at predetermined intervals over a period of time; and
   identifying the respective image of the displayed interface that includes the game data from among the sequence of images based on comparisons to a reference image stored at the client device.

10. A client device, comprising:
    one or more processors;
    a display; and
    memory storing one or more programs to be executed by the one or more processors, the one or more programs comprising instructions for:
       while a game is executing on the client device, capturing a respective image of at least a portion of a displayed interface of the game, the respective image includes game data corresponding to game performance of a user of the client device, wherein capturing the respective image of at least a portion of the displayed interface of the game includes:
applying a mask to the displayed interface of the game, wherein the mask includes a first opening at a first location of the mask that corresponds to an avatar of the user in the displayed interface of the game and the mask includes a second opening at a second location of the mask that corresponds to performance data of the user in the displayed interface of the game, and
capturing an image of the displayed user interface with the applied mask;
providing, to a server system, the respective image for extraction of the game data from the respective image of at least the portion of the displayed interface of the game; and
in response to providing the respective image to the server system, receiving, from the server system, game ranking information specifying a ranking for the user that is based at least in part on the game data extracted from the respective image of at least the portion of the displayed interface of the game.

11. The client device of claim 10, wherein capturing the respective image of at least the portion of the displayed interface of the game further comprises:
invoking a screen capture function of a respective operating system of the client device while the game data is being displayed on the display of the client device.

12. The client device of claim 11, wherein capturing the respective image of at least the portion of the displayed interface of the game further comprises:
discarding at least one portion of a full screen shot output by the screen capture function to obtain the respective image including the game data.

13. The client device of claim 10, further comprising instructions for:
displaying the game ranking information in an interface of a social networking platform, wherein the game ranking information includes relative rankings of the user and one or more social network contacts of the user on the social networking platform.

14. The client device of claim 10, further comprising instructions for:
prior to capturing the respective image of at least the portion of displayed interface of the game, detecting a user input while the interface of the game is being displayed on the display of the client device, the user input being directed to a software program distinct from the game, and
wherein the respective image of at least the portion of the displayed interface of the game is captured in response to detecting the user input.

15. The client device of claim 14, further comprising instructions for:
while the interface of the game is being displayed on the display of the client device, concurrently displaying an affordance that is independent of the game, wherein the detected user input is user selection of the affordance.

16. The client device of claim 10, wherein capturing the respective image of the displayed interface of the game that includes the game data further comprises:

capturing a sequence of images of the displayed interface of the game at predetermined intervals over a period of time; and
identifying the respective image of the displayed interface that includes the game data from among the sequence of images based on comparisons to a reference image stored at the client device.

17. A non-transitory computer readable storage medium storing one or more programs, the one or more programs comprising instructions, which, when executed by a client device with one or more processors and a display, cause the client device to perform operations comprising:
while a game is executing on the client device, capturing a respective image of at least a portion of a displayed interface of the game, the respective image includes game data corresponding to game performance of a user of the client device, wherein capturing the respective image of at least a portion of the displayed interface of the game includes:
applying a mask to the displayed interface of the game, wherein the mask includes a first opening at a first location of the mask that corresponds to an avatar of the user in the displayed interface of the game and the mask includes a second opening at a second location of the mask that corresponds to performance data of the user in the displayed interface of the game, and
capturing an image of the displayed user interface with the applied mask;
providing, to a server system, the respective image for extraction of the game data from the respective image of at least the portion of the displayed interface of the game; and
in response to providing the respective image to the server system, receiving, from the server system, game ranking information specifying a ranking for the user that is based at least in part on the game data extracted from the respective image of at least the portion of the displayed interface of the game.

18. The non-transitory computer readable storage medium of claim 17, wherein capturing the respective image of at least the portion of the displayed interface of the game further comprises:
invoking a screen capture function of a respective operating system of the client device while the game data is being displayed on the display of the client device.

19. The non-transitory computer readable storage medium of claim 18, wherein capturing the respective image of at least the portion of the displayed interface of the game further comprises:
discarding at least one portion of a full screen shot output by the screen capture function to obtain the respective image including the game data.

20. The non-transitory computer readable storage medium of claim 17, further comprising instructions, which cause the client device to perform operations comprising:
displaying the game ranking information in an interface of a social networking platform, wherein the game ranking information includes relative rankings of the user and one or more social network contacts of the user on the social networking platform.

* * * * *